US010339183B2

(12) United States Patent
Kohlmeier et al.

(10) Patent No.: US 10,339,183 B2
(45) Date of Patent: Jul. 2, 2019

(54) DOCUMENT STORAGE FOR REUSE OF CONTENT WITHIN DOCUMENTS

(71) Applicant: Microsoft Technology Licensing, LLC, Redmond, WA (US)

(72) Inventors: Bernhard S. J. Kohlmeier, Seattle, WA (US); Pradeep Chilakamarri, Seattle, WA (US); Bjørn Olstad, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 14/858,894

(22) Filed: Sep. 18, 2015

(65) Prior Publication Data
US 2016/0371259 A1  Dec. 22, 2016

Related U.S. Application Data

(60) Provisional application No. 62/182,990, filed on Jun. 22, 2015.

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/285* (2019.01); *G06F 16/9024* (2019.01); *G06Q 10/10* (2013.01)

(58) Field of Classification Search
CPC ......... G06F 17/30011; G06F 17/30598; G06F 17/30958; G06F 16/93; G06F 16/2858; G06F 16/9024; G06Q 10/10
(Continued)

(56) References Cited

U.S. PATENT DOCUMENTS 5,953,720 A    9/1999  Mithal et al.
5,956,736 A    9/1999  Hanson et al.
(Continued)

FOREIGN PATENT DOCUMENTS

CN    101490676 A    7/2009
CN    103177075 A    6/2013
(Continued)

OTHER PUBLICATIONS

"International Search Report and Written Opinion Issued in PCT Application No. PCT/US2016/038589", dated Sep. 6, 2016, 13 Pages.
(Continued)

*Primary Examiner* — Thanh-Ha Dang
(74) *Attorney, Agent, or Firm* — Talem IP Law, LLP

(57) ABSTRACT

A system for reuse of content within documents can include storage media on which a document graph is stored, and labeler software that, when executed by a processing system, directs the processing system to at least: aggregate, for a window of time, a plurality of actions carried out by a user on content associated with a document within a productivity application; normalize the plurality of actions into at least one predefined action class; determine a label of the user in relation to the document or a portion of the content associated with the document based on the at least one predefined action class; and store the label associated with the user and the document or the portion of the content in a document graph. A search of the document graph for reusable content can then be directed to related content associated with a user having a particular label.

17 Claims, 14 Drawing Sheets

(51) Int. Cl.
*G06F 16/28* (2019.01)
*G06F 16/901* (2019.01)
*G06Q 10/10* (2012.01)

(58) Field of Classification Search
USPC ........................................................ 707/737
See application file for complete search history.

(56) References Cited

U.S. PATENT DOCUMENTS

| | | | |
|---|---|---|---|
| 6,088,707 | A | 7/2000 | Bates et al. |
| 7,007,034 | B1 | 2/2006 | Hartman, Jr. et al. |
| 7,143,091 | B2 | 11/2006 | Charnock et al. |
| 7,464,330 | B2 | 12/2008 | Bishop et al. |
| 7,568,184 | B1 | 7/2009 | Roth |
| 7,594,166 | B1 | 9/2009 | Ramakrishna et al. |
| 7,681,112 | B1 | 3/2010 | Francis |
| 7,783,967 | B1 | 8/2010 | Carnell et al. |
| 7,831,601 | B2 | 11/2010 | Oral et al. |
| 7,870,478 | B1 | 1/2011 | Chiaro, Jr. et al. |
| 7,984,035 | B2 | 7/2011 | Levin et al. |
| 8,046,387 | B2 | 10/2011 | Nelson |
| 8,050,906 | B1 | 11/2011 | Zimmerman et al. |
| 8,176,466 | B2 | 5/2012 | Tristram |
| 8,255,819 | B2 | 8/2012 | Chang et al. |
| 8,352,397 | B2 | 1/2013 | Rubin et al. |
| 8,429,099 | B1 | 4/2013 | Perkowitz et al. |
| 8,504,583 | B1 | 8/2013 | Ke et al. |
| 8,583,673 | B2 | 11/2013 | Tarek et al. |
| 8,682,989 | B2 | 3/2014 | Meisels et al. |
| 8,914,720 | B2 | 12/2014 | Harrington |
| 8,954,441 | B1 | 2/2015 | Baranov et al. |
| 9,247,021 | B1 | 1/2016 | Obbard et al. |
| 9,703,762 | B1 | 7/2017 | Chitale et al. |
| 9,779,063 | B1 | 10/2017 | Dykema |
| 2003/0097640 | A1 | 5/2003 | Abrams et al. |
| 2003/0212546 | A1 | 11/2003 | Shaw |
| 2004/0093559 | A1 | 5/2004 | Amaru et al. |
| 2004/0158496 | A1* | 8/2004 | Tenorio .................. G06Q 30/06 705/51 |
| 2004/0220926 | A1 | 11/2004 | Lamkin et al. |
| 2005/0010896 | A1 | 1/2005 | Meliksetian et al. |
| 2005/0125728 | A1 | 6/2005 | Peiro et al. |
| 2005/0138033 | A1 | 6/2005 | Katta et al. |
| 2005/0216454 | A1 | 9/2005 | Diab et al. |
| 2006/0041589 | A1 | 2/2006 | Helfman et al. |
| 2006/0136477 | A1 | 6/2006 | Bishop et al. |
| 2006/0156220 | A1 | 7/2006 | Dreystadt et al. |
| 2006/0190815 | A1 | 8/2006 | Jones et al. |
| 2006/0206798 | A1* | 9/2006 | Kohlmeier ................. G06F 8/38 715/201 |
| 2006/0218171 | A1 | 9/2006 | Wakeam et al. |
| 2006/0294469 | A1 | 12/2006 | Sareen et al. |
| 2007/0011608 | A1* | 1/2007 | Titemore ............ G06F 17/2229 715/209 |
| 2007/0100829 | A1* | 5/2007 | Allen ..................... G06F 16/958 |
| 2007/0106952 | A1 | 5/2007 | Matas et al. |
| 2007/0226684 | A1 | 9/2007 | Boske et al. |
| 2007/0233681 | A1 | 10/2007 | Ronen et al. |
| 2007/0239761 | A1* | 10/2007 | Baio ................. G06F 17/30722 |
| 2007/0266309 | A1 | 11/2007 | Sellman |
| 2007/0266342 | A1 | 11/2007 | Chang et al. |
| 2007/0288518 | A1 | 12/2007 | Crigler et al. |
| 2007/0300054 | A1 | 12/2007 | Lo et al. |
| 2008/0109832 | A1 | 5/2008 | Ozzie et al. |
| 2008/0294981 | A1 | 11/2008 | Balzano et al. |
| 2009/0157711 | A1 | 6/2009 | Baer et al. |
| 2009/0164941 | A1 | 6/2009 | Johnson et al. |
| 2009/0249180 | A1* | 10/2009 | Cheng .................. G06F 17/211 715/206 |
| 2009/0300547 | A1 | 12/2009 | Bates et al. |
| 2010/0077290 | A1 | 3/2010 | Pueyo |
| 2010/0082570 | A1 | 4/2010 | Altaf et al. |
| 2010/0121877 | A1 | 5/2010 | Fawcett et al. |
| 2011/0029952 | A1 | 2/2011 | Harrington |
| 2011/0078615 | A1 | 3/2011 | Bier |
| 2011/0087516 | A1 | 4/2011 | Frieden et al. |
| 2011/0167332 | A1 | 7/2011 | Nickas, Jr. |
| 2011/0179049 | A1 | 7/2011 | Caldwell et al. |
| 2011/0238650 | A1 | 9/2011 | Jenkins et al. |
| 2011/0270851 | A1 | 11/2011 | Mishina et al. |
| 2012/0110443 | A1 | 5/2012 | Lemonik et al. |
| 2012/0117093 | A1 | 5/2012 | Shilovitsky et al. |
| 2012/0191716 | A1 | 7/2012 | Omoigui |
| 2012/0278080 | A1 | 11/2012 | Singh et al. |
| 2012/0290926 | A1 | 11/2012 | Kapadia et al. |
| 2013/0036117 | A1 | 2/2013 | Fisher et al. |
| 2013/0036348 | A1 | 2/2013 | Hazard |
| 2013/0173604 | A1 | 7/2013 | Li et al. |
| 2013/0185252 | A1* | 7/2013 | Palmucci ................. G06F 16/93 707/608 |
| 2013/0185622 | A1 | 7/2013 | Odean et al. |
| 2013/0204664 | A1* | 8/2013 | Romagnolo ....... G06Q 30/0203 705/7.32 |
| 2013/0212463 | A1 | 8/2013 | Pachikov et al. |
| 2014/0143250 | A1* | 5/2014 | Martin .............. G06F 17/30598 707/737 |
| 2014/0201331 | A1* | 7/2014 | Kershaw ............... H04W 4/001 709/219 |
| 2014/0279927 | A1 | 9/2014 | Constantinescu et al. |
| 2014/0281850 | A1 | 9/2014 | Prakash et al. |
| 2014/0289645 | A1 | 9/2014 | Megiddo et al. |
| 2015/0046260 | A1 | 2/2015 | Engebretsen et al. |
| 2015/0046493 | A1 | 2/2015 | Akselrod et al. |
| 2015/0161079 | A1* | 6/2015 | Grosfeld .............. G06F 17/211 715/209 |
| 2015/0331914 | A1* | 11/2015 | Cherukuri ......... G06F 16/24569 707/709 |
| 2015/0379887 | A1* | 12/2015 | Becker ................... G06F 16/93 715/229 |
| 2016/0134667 | A1* | 5/2016 | Suresh .................. G06F 16/951 715/753 |
| 2016/0285694 | A1* | 9/2016 | Maes .................... G06F 9/5072 |
| 2016/0299976 | A1* | 10/2016 | Brunn .................... G06Q 50/01 |
| 2016/0357842 | A1 | 12/2016 | Kohlmeier et al. |
| 2016/0371249 | A1 | 12/2016 | Chilakamarri et al. |

FOREIGN PATENT DOCUMENTS

| | | | |
|---|---|---|---|
| EP | 1843256 | A1 | 10/2007 |
| WO | 2014028300 | A1 | 2/2014 |
| WO | 2015065776 | A1 | 5/2015 |
| WO | 2015066657 | A1 | 5/2015 |

OTHER PUBLICATIONS

Edwards, et al., "Timewarp: Techniques for Autonomous Collaboration", In Proceedings of the ACM SIGCHI Conference on Human factors in computing systems; Mar. 22, 1997; 8 pages.

O'Callaghan, et al., "A Strategy Development Process for Enterprise Content Management", In Proceedings of 13th European Conference on Information Systems; Jan. 1, 2005; 13 pages.

Bendersky, et al., "Finding Text Reuse on the Web", In proceedings of Second ACM International Conference on Web Search and Data Mining; Feb. 9, 2009; pp. 262-272.

Viégas, et al., "Studying Cooperation and Conflict between Authors with history flow Visualizations", In Proceedings of the SIGCHI Conference on Human Factors in Computing Systems, vol. 6, Issue 1; Apr. 24, 2004; 8 pages.

Mejova, et al., "Reuse in the Wild: An Empirical and Ethnographic Study of Organizational Content Reuse", In Proceedings of the SIGCHI Conference on Human Factors in Computing Systems; May 7, 2011; pp. 2877-2886.

Kohlmeier, et al.; U.S. Appl. No. 14/499,195, "Productivity Tools for Content Authoring," filed Sep. 28, 2014.

Kohlmeier, et al.; U.S. Appl. No. 14/858,910, "Document Storage for Reuse of Content Within Documents," filed Sep. 18, 2015; (claims only).

"Document Collaboration and Co-Authoring.", Retrieved from: <<https://support.office.com/en-gb/article/Document-collaboration-

(56) References Cited

OTHER PUBLICATIONS and-co-authoring-ee1509b4-1f6e-401e-b04a-782d26f564a4?ui=en-US&rs=en-GB&ad=GB>>, Retrieved on: Mar. 18, 2015, 5 Pages.
"Enterprise Content Creation.", Retrieved from: <<https://web.archive.org/web/20150315210239/http://www.objective.com/products/enterprise-content-creation/collaborative-authoring>>, Retrieved on: Mar. 15, 2015, 3 Pages.
"Evernote", Retrieved from: <<http://www.dsruption.com/evernote/a/5287d9337782650200000095>>, Retrieved on: Nov. 26, 2013, 4 Pages.
"Final Office Action Issued in U.S. Appl. No. 14/319,654", dated Dec. 27, 2016, 43 Pages.
"Final Office Action Issued in U.S. Appl. No. 14/319,654", dated Oct. 27, 2017, 36 Pages.
"Non Final Office Action Issued in U.S. Appl. No. 14/319,654", dated Apr. 14, 2017, 38 Pages.
"Non Final Office Action Issued in U.S. Appl. No. 14/319,654", dated May 4, 2018, 27 Pages.
"Non Final Office Action Issued in U.S. Appl. No. 14/319,654", dated Jul. 11, 2016, 37 Pages.
"Final Office Action Issued in U.S. Appl. No. 14/858,910", dated Jun. 6, 2018, 23 Pages.
"Non Final Office Action Issued in U.S. Appl. No. 14/858,910", dated Oct. 12, 2017, 18 Pages.
"Office Action Issued in European Patent Application No. 14753419.2", dated Mar. 6, 2017, 6 Pages.
"Summons for Oral Hearing Issued in European Patent Application No. 14753419.2", dated Dec. 21, 2017, 7 Pages.
"Final Office Action Issued in U.S. Appl. No. 15/087,355", dated Aug. 15, 2018, 34 Pages.
"Non Final Office Action Issued in U.S. Appl. No. 15/087,355", dated Mar. 7, 2018, 29 Pages.
"First Office Action and Search Report Issued in Chinese Patent Application No. 201480044794.X", dated May 2, 2018, 13 Pages.
Bosnic, et al., "Automatic Keywords Extraction—a Basis for Content Recommendation", In Proceedings of the Fourth International Workshop on Search and Exchange of E-learning Materials, Sep. 27, 2010, pp. 51-60.
Chakrabarti, et al., "Entity Tagger: Automatically Tagging Entities with Descriptive Phrases", In 20th International Conference Companion on World Wide Web, Mar. 28, 2011, pp. 19-20.
Dontcheva, et al., "Collecting and Organizing Web Content", In Personal Information Management—Special Interest Group for Information Retrieval Workshop, Aug. 10, 2006, pp. 44-47.
Nguyen, et al., "Synthesizing Products for Online Catalogs", In Proceedings of the Very Large Database Endowment, vol. 4, Issue 7, Apr. 1, 2011, pp. 409-418.
"International Preliminary Report on Patentability Issued in PCT Application No. PCT/US2014/050007", dated Nov. 25, 2015, 6 Pages.
"International Search Report and Written Opinion Issued in PCT Patent Application No. PCT/US2014/050007", dated Dec. 15, 2014, 13 Pages.
"Second Written Opinion Issued in PCT Application No. PCT/US2014/050007", dated Jun. 12, 2015, 6 Pages.
"International Preliminary Report on Patentability Issued in PCT Application No. PCT/US2016/038590", dated Sep. 1, 2017, 9 Pages.
"International Search Report and Written Opinion Issued in PCT Application No. PCT/US2016/038590", dated Sep. 6, 2016, 11 Pages.
"Second Written Opinion Issued in PCT Application No. PCT/US2016/038590", dated May 11, 2017, 8 Pages.
"International Search Report and Written Opinion Issued in PCT Application No. PCT/US2016/038595", dated Sep. 6, 2016, 14 Pages.
"Non Final Office Action Issued in U.S. Appl. No. 14/858,910", dated Sep. 21, 2018, 21 Pages.
"Non Final Office Action Issued in U.S. Appl. No. 15/087,355", dated Nov. 16, 2018, 36 Pages.
"Second Office Action Issued in Chinese Patent Application No. 201480044794.X", dated Dec. 5, 2018, 14 Pages.
"Final Office Action Issued in U.S. Appl. No. 14/319,654", dated Jan. 8, 2019, 27 Pages.

* cited by examiner

DOCUMENT STORAGE FOR REUSE OF CONTENT WITHIN DOCUMENTS

CROSS-REFERENCE TO RELATED APPLICATION

This application claims the benefit of U.S. Provisional Application Ser. No. 62/182,990, filed Jun. 22, 2015.

BACKGROUND

Productivity applications such as word processing, spreadsheet, and presentation applications can include a variety of tools and information that facilitate the accomplishment of a variety of tasks related to producing content, including creating and editing content within different types of documents such as word processing documents, spreadsheets, and presentations. Many productivity applications also include collaboration tools that enable multiple users to co-author and collaborate in a single document. Productivity applications may also include tools and/or mechanisms for sharing or publishing content to a variety of platforms.

While creating and editing content within a productivity application, a user may start with a blank page document and may create new content. Additionally a user may borrow content from other sources and/or existing documents, and the user may use the borrowed content without modification or may update the content. As content is reused and modified in multiple different documents by multiple users, it may become cumbersome to trace a history of the original content and to determine who created, contributed, and/or changed the content. Finding relevant information from online, remote, or local sources can also be a challenge.

BRIEF SUMMARY

Techniques and systems for facilitating content reuse are presented. As content is created, shared, modified and reused by multiple users in new and existing documents, a document graph is generated and updated to keep track of relationships between content (including identifiable components, such as a table, image, paragraph, and title), documents containing the content, users performing actions on the content and/or the documents, and the actions being performed (including creating, reading, updating, deleting, and the like). This document graph can be leveraged to identify relevant reusable content and track its reuse.

In certain embodiments, each reusable component of content within a document can be extracted and then stored, searched, and retrieved independently of the source document.

In certain embodiments, actions of a user with respect to a document or the content therein while working within a productivity application for a duration of a window of time can be aggregated, and the aggregated actions normalized to an action class. The normalized action can be written to a document graph, for example as an edge between a node representing a user and a node representing a document or a piece of content. In addition to being able to normalize actions a user may take upon content, a user's activity with respect to one or more pieces of content—whether part of a normalized action or not—can be mapped to actor classes. Through the normalized actions and connected users, a particular piece of content or document can also be classified a particular content class.

The various classification processes can be carried out by a labeler executed by a computing system or as part of a service. In some cases, the labeler can store an identified actor class on the document graph to indicate the relationship between the interacting user and the particular document and/or portion of content. Similarly, the labeler can store an identified content class on the graph to indicate the relationship between the particular content/document and how it is used or consumed by users. A timestamp can also be included to facilitate identification of how current the label is.

In some cases the labeler or a separate indexing service can extract out any content components (e.g., pictures, tables, slides, plots, outlines and the like) from the document to identify content components for reuse. The extracted content components can be identified on a document graph and assigned a component type (as part of an edge between a user node or a source document node and the extracted component node or as data associated with the extracted component node). The extraction may also include the activity history (e.g., normalized action or classification) of a piece of content forming the extracted component.

The actor class assigned to a user and/or a content class assigned to a piece of content (of a document or extracted content component) by a labeler, as well as the component types assigned to an extracted content component, can be leveraged to identify content for reuse as well as provide additional features for productivity applications and collaboration.

A productivity application can communicate with a service to request reusable content components and other content associated with a document. The productivity application can also request reusable content based on one or more labels assigned to actors associated with the content and the content itself.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems for facilitating content reuse are presented. For example, content reuse can be facilitated through the storage of information in a document graph. As content in new and existing documents is created, shared, modified and reused by various users of an application supporting these activities, a document graph can be generated and updated to keep track of the relationships between content, documents containing the content, users performing actions on the content and/or the documents, and the actions being performed (including creating, reading, updating, deleting, and the like).

It is expected that the content that a user is most likely to want to reuse is content that was created or interacted with by someone that has a particular relationship to them or an organization to which they belong. An enhanced document graph can be generated to store information indicating types of relationships between people and even between content. In addition, the documents represented in the document graph can have their reusable content components indexed and these content components can also be represented in the document graph.

Figure 1A:
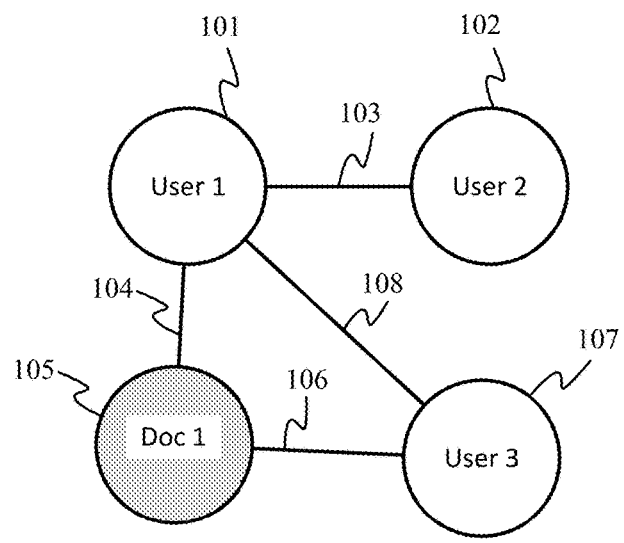
FIGS. 1A-1C illustrate visual representations of document graphs that may be generated, and queried, for content reuse such as described herein.
Figure 1B:
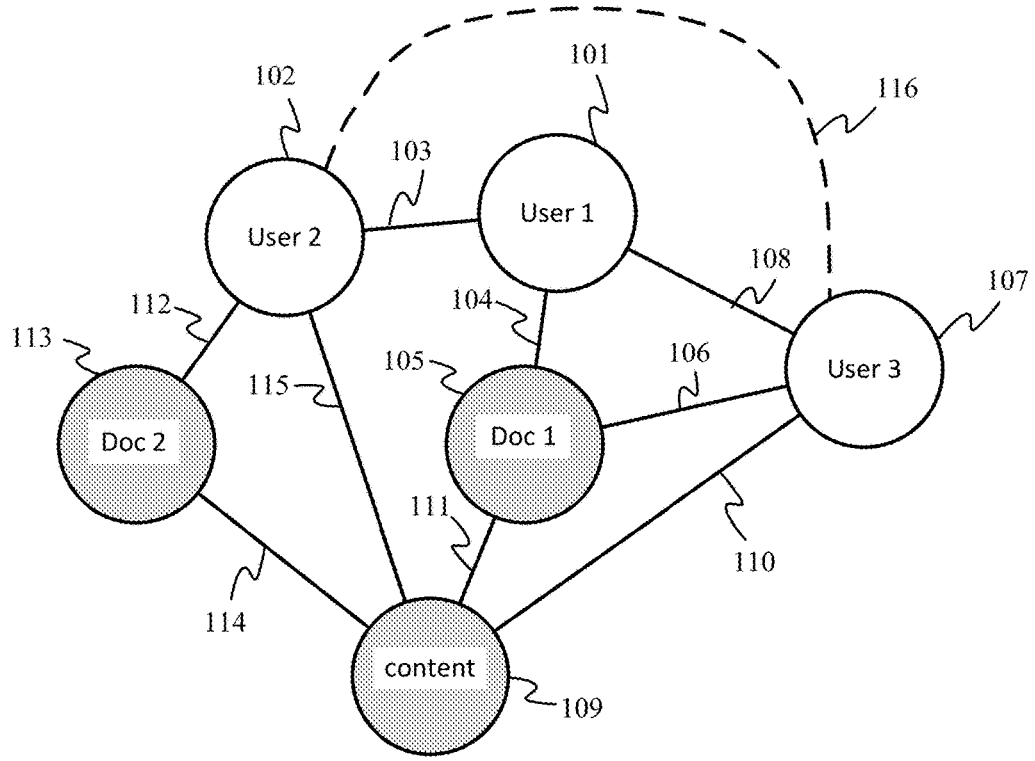
Figure 1C:
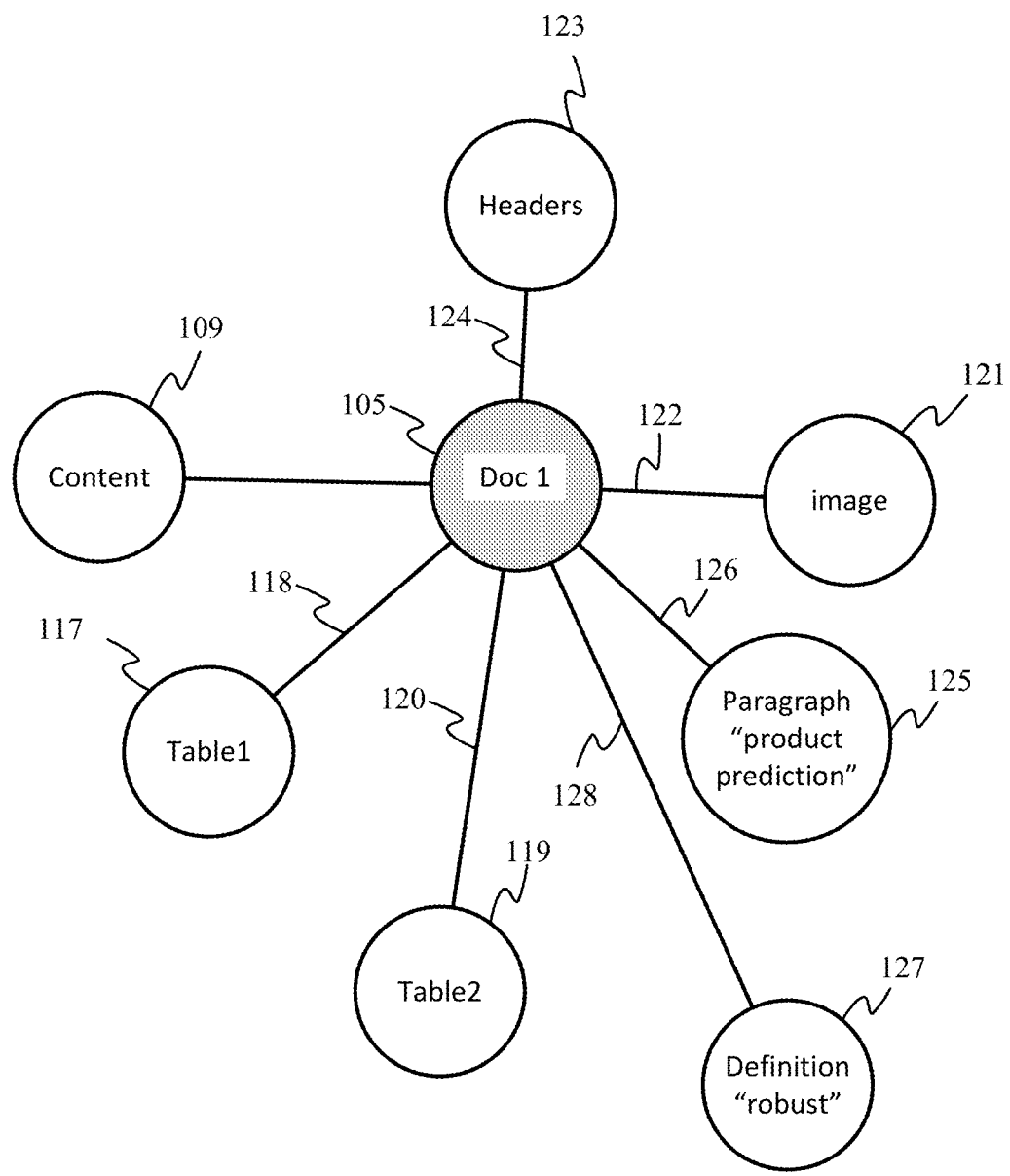

FIGS. 1A-1C illustrate visual representations of document graphs that may be generated, and queried, for content reuse such as described herein. A document graph is a data structure that maps relationships between users, between a user and particular documents, and between documents. In some cases various granularity of content within a document can be mapped within the document graph. Granularity of content includes, but is not limited to, identifiable components such as a table, image, paragraph, title, slide, outline, and other application-defined objects that can contain content.

A document graph can include nodes representing an entity (a person or an object) and edges representing connections between nodes (e.g., the relationship or action associated with the two entities). Nodes may be identified in a document graph by a node identifier (ID). For example, a person, a document, or other object may have been assigned or can be assigned an identifier used to represent it in the document graph. Other types of identifiers are possible and may be considered within the scope of the present disclosure.

The edges may have various properties, such as the type of action that the edge represents, a target of the edge, a source of the edge (an email system or file storage system, for example, or a user or object), a date or time stamp, a relative importance of the action, and whether or not the action is private or public. Other edge properties in addition to or in place of those disclosed herein are possible. For example, an edge property assigned for reusable components can include 'contains' indicating that the reusable component is part of, and associated with, a particular document. The edge property may also include additional details regarding action or actor such as whether the reusable component was created/originated as part of that particular document, was inserted into that particular document, and by whom). Edges can also be given weights to indicate their relative importance. This may be useful in the context of two edges of the same type to indicate the importance of one relative to the other.

Referring to FIG. 1A, a plurality of connections are shown between users and users and between users and documents. For example, a first node 101 indicating User1 and a second node 102 indicating User2 are shown connected by first relationship edge 103 representing that there is a relationship between the two users. In addition, the first node 101 indicating User1 is shown connected by a first action edge 104 to a first document 105. In this case, the first relationship edge 103 indicates that User1 and User2 are members of a same work group; and the first action edge 104 indicates that User1 created the first document 105.

A document, such as the first document 105, may include any item associated with a productivity application, such as for example, a word processing file, an email, a calendar item, a meeting request, a contact, or other similar item that includes content associated with the item.

Other users may interact with and/or collaborate on the same documents and this information stored in the document graph. For example a User3, who is not in the same work group as User1 and User2 may have collaborated with User1 on the first document 105. The document graph can reflect this connection using a second action edge 106 connecting a fourth node 107 representing User3 to the first document 105. According to various implementations, action edges include properties indicating an action or class of actions. Further implementations include a date and/or time information (e.g., in the form of a timestamp for the action, a session identifier, a particular time period captured by the system, or other suitable identifier or granularity). Some example actions may include edit, modify, read, share, copy and paste, present, or other similar action. In some further examples, metadata associated with specific edits and modifications to content may be saved but not visually represented on the document graph. In some cases, as an action is associated with a portion of content, or a content node, the action may be also automatically inherited by the document that contains the piece of content being acted on.

In some cases, connections between user nodes can also be established based on interactions with documents (and not just external indicators such as work teams). For example, User1 can be connected by a second relationship edge 108 to the fourth node 107 representing User3 to reflect that the two people may be relevant to each other in some manner. The relationship edges can include various properties that could be used to traverse the document graph and understand the relationships between the people. In some cases where such edges are included, the number of hops that may be undertaken during a search of the document graph can be minimized.

Referring to FIG. 1B, the document graph can store a finer granularity of detail. Here, the document graph indicates not just that User3 is connected to the first document 105 by second action edge 106 indicating that the User3 acted on the document, but also that User3 specifically performed an action with respect to a specific content 109 (e.g., paragraph of text) for the first document 105. The third action edge 110 between the fourth node 107 representing User3 and the specific content 109 can indicate this finer granularity of action. The specific content 109 can be indicated as being connected to the first document by a first "contains" edge 111.

Not only can the actions taken on a particular document be stored in the document graph, but the reuse of the particular document and/or content therein be stored as part of the document graph as well. For example, User2 may create a new document, reflected in the graph as fourth action edge 112 representing the action create that connects the second node 102 representing User2 to a second document 113. In addition, User2 may have copied the specific content 109 into the second document 113. This activity and corresponding relationships can then be reflected in the document graph as second 'contains' edge 114 between the specific content 109 and the second document 113, indicating that the second document 113 contains the specific content 109; a fifth action edge 115 between the specific content 109 and the second node 102 representing User2, which can indicate that the User2 performed an action of consumed/copied the specific content; and in some cases, an additional edge or property of an existing edge to indicate a relationship between users as a result of the reuse of specific content 109. Regarding this last relationship, it may be reflected by an additional property and data on the first relationship edge between the first node 101 representing User1 and the second node 102 representing User2; and/or as a new edge (e.g., third relationship edge 116) between the second node 102 representing User2 and the fourth node 107 representing User3.

FIG. 1C shows additional detail regarding reusable components of the first document 105. In addition to specific content 109 that is added as a node to the graph because of an action taken on it by a user, reusable components of the first document 105 can be identified and at least indexed. For example, a "document shredder" (a module or software application that deconstructs a document into reusable components) can identify the specific content components within a document that are likely to be reused in others. Examples of these specific content components include images, visualizations/charts (e.g., as available from certain spreadsheet applications), data tables, slides, and the like.

Figure 2:
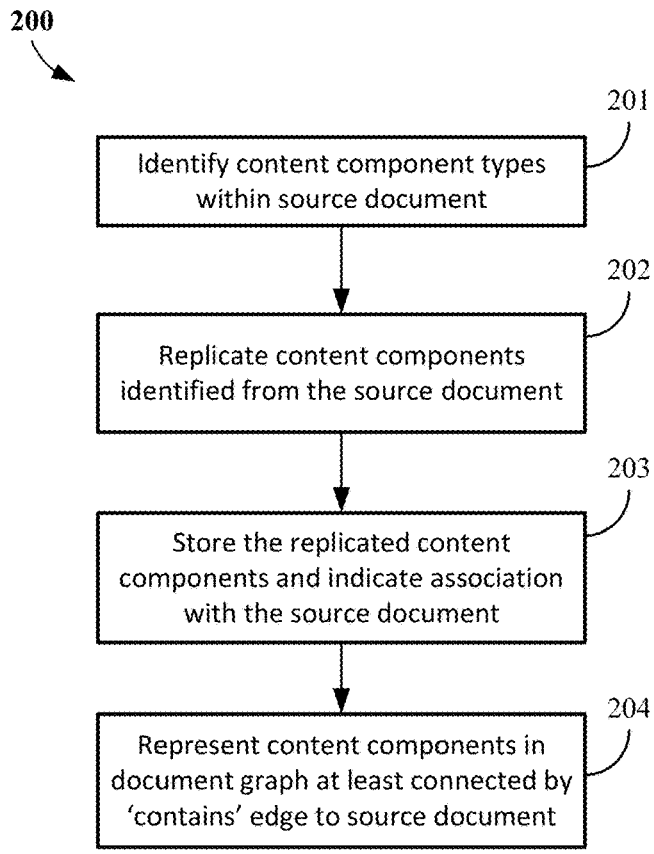
FIG. 2 illustrates an example process that may be carried out by a document shredder.

In one implementation, such as shown in FIG. 2, the document shredder can include instructions 200 that direct a system to identify content component types (such as application specific, pre-defined content component types and other identified content components that may be content based) within a source document (201), replicate the content components associated with the identified content component types (202), and store the replicated content components associated with the source document (203). In some cases, the replicated content components are stored separately from the source document. As an alternative to replicating the content components and optionally storing the replicated content components separately from the source document, the content components can be identified using metadata or other markup on the source file. The metadata or other markup indicating the identified content components can be stored associated with the source document.

As part of, or subsequent to, the identifying of content component types within a source document, the identified components can be indexed and represented as nodes in a document graph that connected to the document by a 'contains' edge (which may also include other properties) (204).

In some cases where the content components are separately stored, the separately stored content components can be synced to their counterparts in the source document or at least connected in a manner that if not included in another document, the content component can be deleted when the source document is deleted. This can be accomplished by parameters or properties assigned to the edges connecting the content component nodes to their respective source documents. The 'contains' edge does not necessarily require that the reusable components be stored and indexed as a separate entity from the source document. Instead, for some implementations, metadata can be written in to or associated with the source document file to highlight specific reusable segments in-place in the document. A single file may be stored in storage, but multiple nodes in the graph can be represented in the document graph that all reference different chunks or pieces of the file. These nodes (representing the content components in the source document) may be connected to each other via an edge indicating that they are siblings (e.g., 'isSibling' edges—not shown in the Figures).

Returning to the example illustrated in FIG. 1C, the first document 105 can be a business report that includes a first table Table1, a second table Table2, an image, and headers. These identified components can be represented on the document graph as node Table1 117 connected to the first document 105 by third contains edge 118, node Table2 119 connected to the first document 105 by fourth contains edge 120, image node 121 connected to the first document 105 by fifth contains edge 122, and headers node 123 connected to the first document 105 by sixth contains edge 124.

Where the document shredder includes additional functionality for identifying portions of text using keywords, key phrase and/or topic detection to identify sections of the text that can relate to the context of the user's document, a portion of text can be extracted and identified as a subcomponent of a document. For example, a content node 125 representing a paragraph containing a topic of a product prediction can be connected to the first document 105 with a seventh contains edge 126.

In some cases, text blocks can be extracted that provide definitions for terms. For example, a definition node 127 can be generated from an extracted text block indicating a definition of the term "robust" that was included in the first document 105. The definition node 127 can be connected to the first document 105 with an eighth contains edge 128. The additional functionality for identifying portions of text can be accomplished via any suitable content analysis algorithms.

For example, the content of a document can be analyzed to identify entities, topics, and key phrase extractions. The key phrase extraction may be trained on a public and/or private corpus. The content in the document may contain various entries, such as text, words, strings, numbers, symbols, images and the like. An entry may be recognizable as an entity based on various characteristics. The analysis of the document can include searching for recognizable entities and/or domains, for example by named entity recognizers and dictionary look-ups. A domain is a category for a series of entities (or items). For example, a domain may be books. An entity refers to a concept (person, organization, location, service, temporal, numeric, monetary etc.) that a document (or other file) is discussing or describing. In the book domain example, they entity may be a specific book. The aspects are the properties or attributes of the entity that are mentioned about the entity and which may be of interest to the user. In the case of a book as an entity, the genre or the premise/plot are examples of the aspects. It should be understood that the term "entity" should not be restricted to specific named entities and may refer to broad concepts such as "sales data" or "pitch deck".

A topic is a distribution of words and that can correspond to an aspect of an entity (and sometimes the entity itself). A topic serves as a subject or category of related information. The topic of an expression can be used for entity disambiguation (e.g., using Latent Dirichlet Allocation (LDA) and its hierarchical variants). Entity disambiguation refers to the identifying of entities from text and their labeling with one of several entity type labels. In some cases, Wikipedia may be used as a comprehensive reference catalog for large-scale entity disambiguation. In other cases, other public and/or private corpus can be used to facilitate the entity disambiguation.

The identification of portions of text as content components may be supplemented by identifying certain components or sub-components in the document such as paragraph or section or region with particular formatting (such as identified by a different style).

In certain embodiments, the identified content components can be copied and stored separately from the original document. In some cases, no tags or modifications to the original document are needed to indicate that components have been identified and indexed on a document graph.

A document graph such as illustrated in FIGS. 1A-1C may be implemented in any system with users that can be identified within the system and have the relationships between them identified. For example, a company may have employees that can be identified by unique user identifiers and may further include a company hierarchy where the employees are assigned groups and managers and/or are assigned roles. Contacts managed by a personal information management application at the enterprise or personal level may also provide identifiable relationships used by a document graph. Another example may include students who may be identified in a school system with unique identifiers and have information that can be used to group students and faculty together such as class schedules, majors, and departments. A graph of a social network, for instance, may include nodes that represent all of the people in a group of people and edges that represent how they are connected to each other.

To optimize and facilitate content reuse, processes are carried out on the document graph and, in some cases, the results of these processes are added to the graph as a node and/or an edge and/or a property thereof.

In various implementations, a document graph can indicate content (and the document(s) to which that content belongs), actions (e.g., create, read, update, delete), actors (e.g., the person or people performing the actions), and information indicating when an action is performed (e.g., a timestamp).

These edge properties can be enhanced and updated by a labeler, which can be implemented as software instructions stored on one or more computer-readable storage media and executed by a processing system. The labeler can, in some cases, be implemented as part of a service. The labeler can be used to perform at least one of normalizing actions into action classes, classifying users into actor classes (based on their interactions with one or more pieces of content and/or documents), and classifying content into content classes (based on the actions various users have taken on the content). Action classes classify a group of actions into a recognizable activity. For example, an author might make a series of edits where they delete comments from others in the document. These atomic actions ("delete comment") are aggregated and classified into a single action class, such as "finalize document". Helpful actor classes include, but are not limited to major reviewer, minor reviewer, commenter, and major contributor. Helpful content classes include, but are not limited to trending content, most influential, influenced by, and other indicators of reuse or consumption.

In some cases, the labeler can incorporate a document shredder so that reusable components—pieces of content—can be identified as being contained, or part of, a particular document by the labeler. The labeler can then classify the reusable components into content classes based on the actions various users have taken on them.

When searching the document graph, a query can be used to identify a "landing" location in the graph (e.g., a "hit" or initial result) and then the graph is "walked" to obtain a final result for the query (which can be returned). A walk is a sequence of graph nodes and graph edges, for example, n0, e1, n1, e2, . . . nk of graph nodes ni and graph edges ei such that for $1 \leq i \leq k$, the edge ei has endpoints n(i−1) and ni. The length of a walk is its number of edges.

Figure 3:
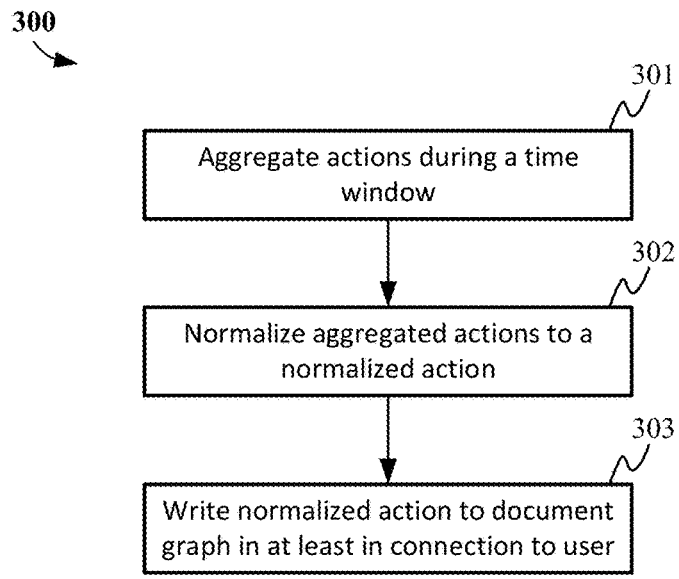
FIG. 3 illustrates an action classification process.

FIG. 3 illustrates an action classification process. Referring to the action classification process 300 shown in FIG. 3, one or more actions carried out by a user are aggregated for a window of time (301). The window of time may be a day, an hour, a session, or any other suitable period of time. The aggregated actions can be stored, at least temporarily in a session log or other suitable data structure as described above. The actions that have been aggregated for the time window are then normalized to an action identified in an action model (302). That is, the actions may be normalized to an action class representative of a category of actions, which may be based on a predefined action model. For example, a predefined action model for the normalized action "edit" can include logged actions such as undo, type, copy, paste, and the like. The actor (user) and the normalized action can be stored associated with a particular document or content. In some cases, the normalized action can be written to a document graph (303), for example, as a property of an edge between a user node and a document node (and/or particular content node).

Figure 4A:
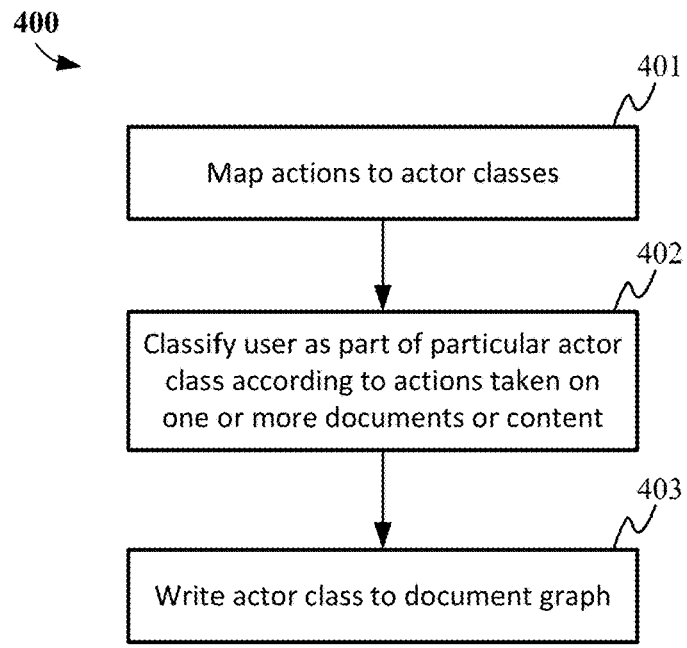
FIG. 4A illustrates a user classification process.

FIG. 4A illustrates a user classification process. Referring to the user classification process 400 as shown in FIG. 4A, users can be classified based on their actions with respect to one or more documents and/or content. These actions can be or include the normalized actions indicated at connecting edges between a user node and document or content node of the document graph.

The classification of the users can be carried out by mapping actions to actor classes (401); and then classifying a user as belonging to one of the actor classes according to the actions that user has taken on one or more documents or content (402). An actor class refers to a role or label that can be given to a user that represents their relationship to a document. For example, a user can be classified as having a particular role or label in general (e.g., based on the user's actions on multiple documents or pieces of content) or with respect to a particular document or piece of content (e.g., based on the various normalized actions that a user may have taken on the particular document or piece of content).

As an illustrative example, predefined actor classes indicating a user's role with respect to a particular document may include reviewer (someone who puts finishing touches on a document, spends a significant time in the document and makes only a minor change, or meets some other conditions for the label of reviewer), minor contributor (someone who meets the conditions set out for this label or does not meet the conditions of a major contributor based on their normalized actions), and major contributor (someone who meets the conditions set out for this label). In this illustrative example, it may be sufficient to base the actor class according to a predefined number of edit actions (as the condition for falling within a particular class).

As other illustrative examples, predefined actor classes may include creator/originator, commenter (someone who uses the comment field in a document), presenter (possibly identified by shares certain content in an online meeting or checking out of a particular content or document from a shared repository multiple times while moving through each slide), influencer (e.g., a user who's created work is reused by others), and propagator (e.g., a user who reuses or shares other people's work). The particular label assigned for an actor class can be obtained from a table or other data structure storing the information.

After the user is classified, the actor class information can be written back into document graph (403), for example as a label. A timestamp can also be included to facilitate identification of how current the label is. In some cases, this information can be indicated on an edge between the user node and one or more document or content nodes from which the actions used to classify the user were connected. In some cases, this information can be indicated as a property of the user node. The actor class for a particular user with respect to one or more documents or content may change over time. Accordingly, in some cases, when a user is classified, a timestamp or other temporal indicator can be stored as well.

Figure 4B:
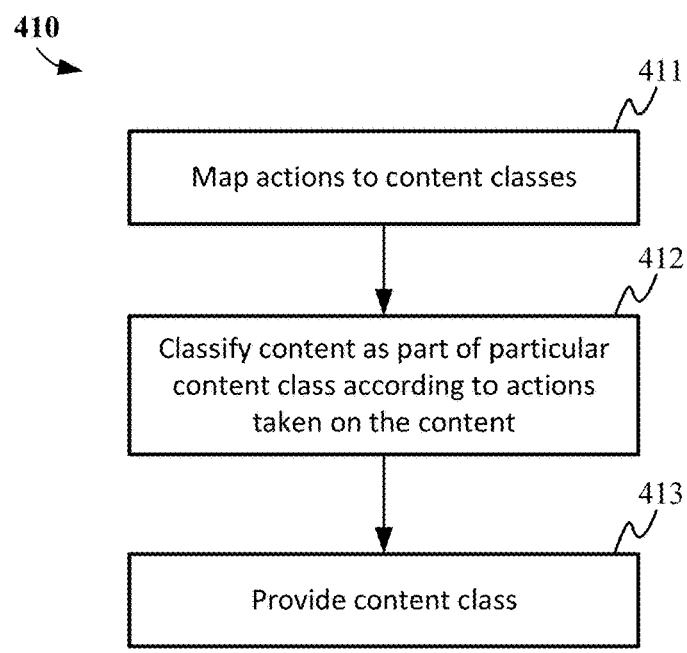
FIG. 4B illustrates a content classification process.

FIG. 4B illustrates a content classification process. Referring to the user classification process 410 as shown in FIG. 4B, content can be classified based on the actions taken upon it. These actions can be or include the normalized actions indicated at connecting edges between a user node and document or content node of the document graph.

The classification of the content can be carried out by mapping actions to content classes (411); and then classifying a piece of content as belonging to one of the content classes according to the actions that users have taken on that piece of content (412). The content class indicates the relationship between the particular content/document and how it is used or consumed by users. Examples of content classes include, but are not limited to, trending content, most influential, and other indicators of reuse or consumption. As an example illustration, a piece of content with actions connected to it indicating a certain number of times that it has been copied into other documents can be classified with an "influential" label. The particular label assigned for a content class can be obtained from a table or other data structure storing the information.

The information about a content class of a particular piece of content can be provided for various uses (413). In some cases, the content class for the piece of content can be written to the document graph. A timestamp can also be included to facilitate identification of how current the label is. In some cases, the content class can be provided to a source of a request for the content class of a piece of content.

The enhanced document graph (and labeler processes 300, 400, and 410) as described herein, may provide assistance for users of a productivity application with tracking a history of particular content portions including when and how it is created, shared, and modified and who has interacted with the content. Additionally, the enhanced document graph may also facilitate identification of content that may be most recently updated and best for reuse, and may indicate one or more users who may be helpful to contact with questions or feedback about a particular content portion. For example, a productivity application (or associated productivity tool) may request user information, document/content information, and/or label information from one or more services, which can then perform various processes in response to that request and provide appropriate results.

Figure 5A:
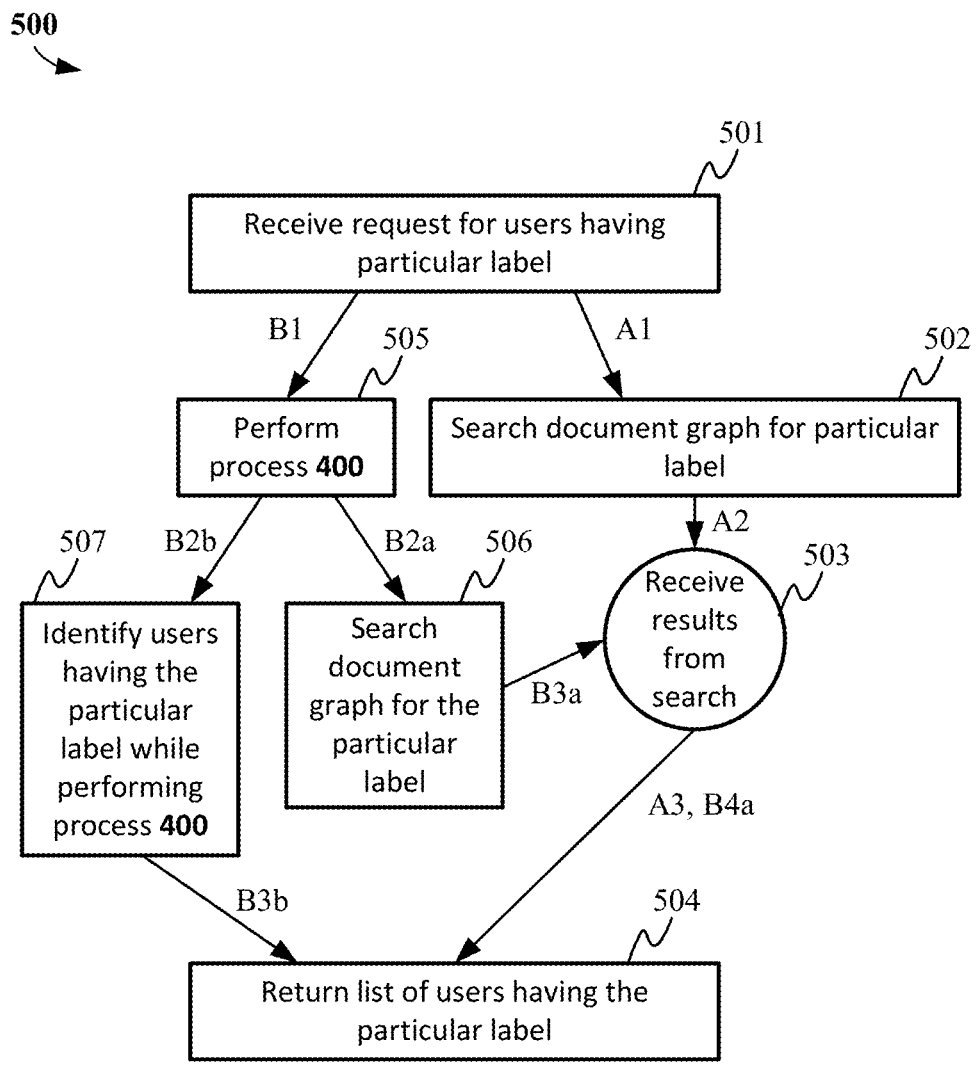
FIGS. 5A-5C illustrate example processes in which the described enhanced document graphs (and associated classifying processes) may be used to improve content reuse.
Figure 5B:
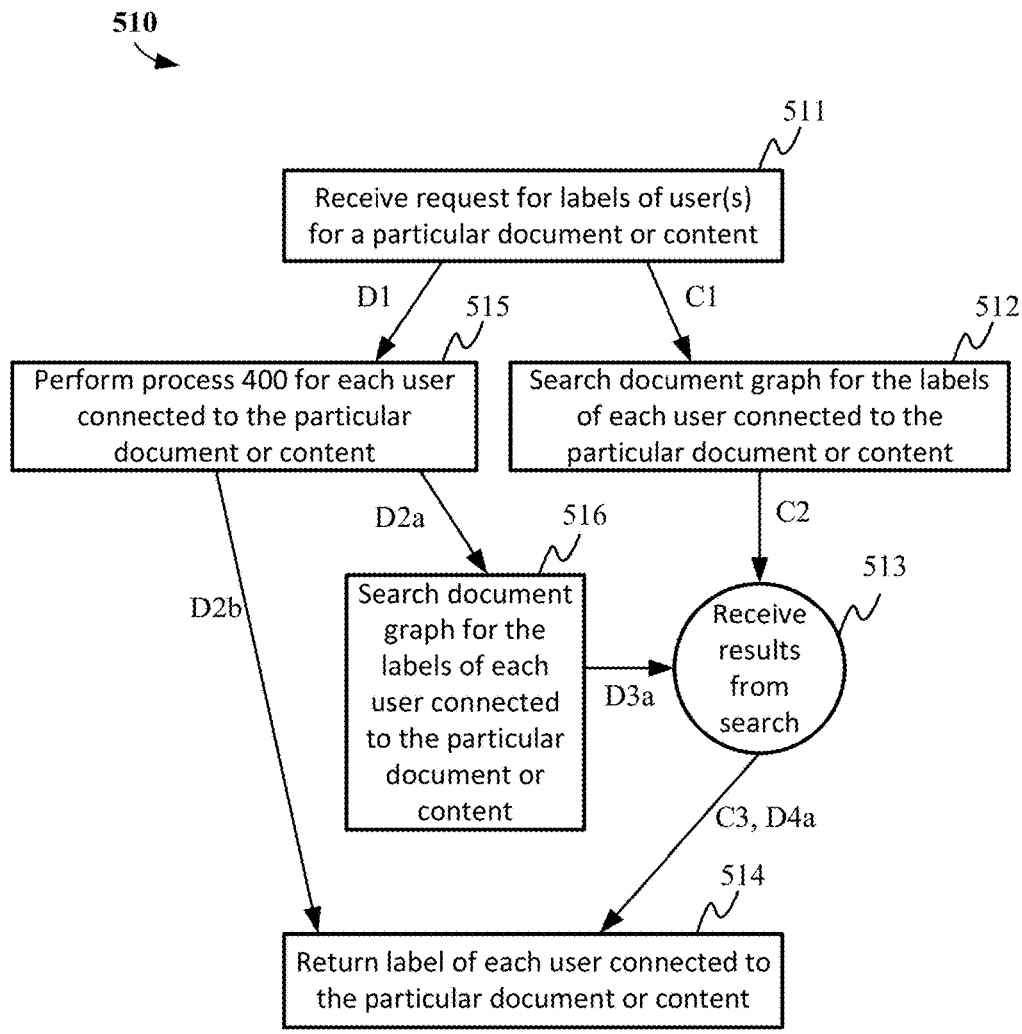
Figure 5C:
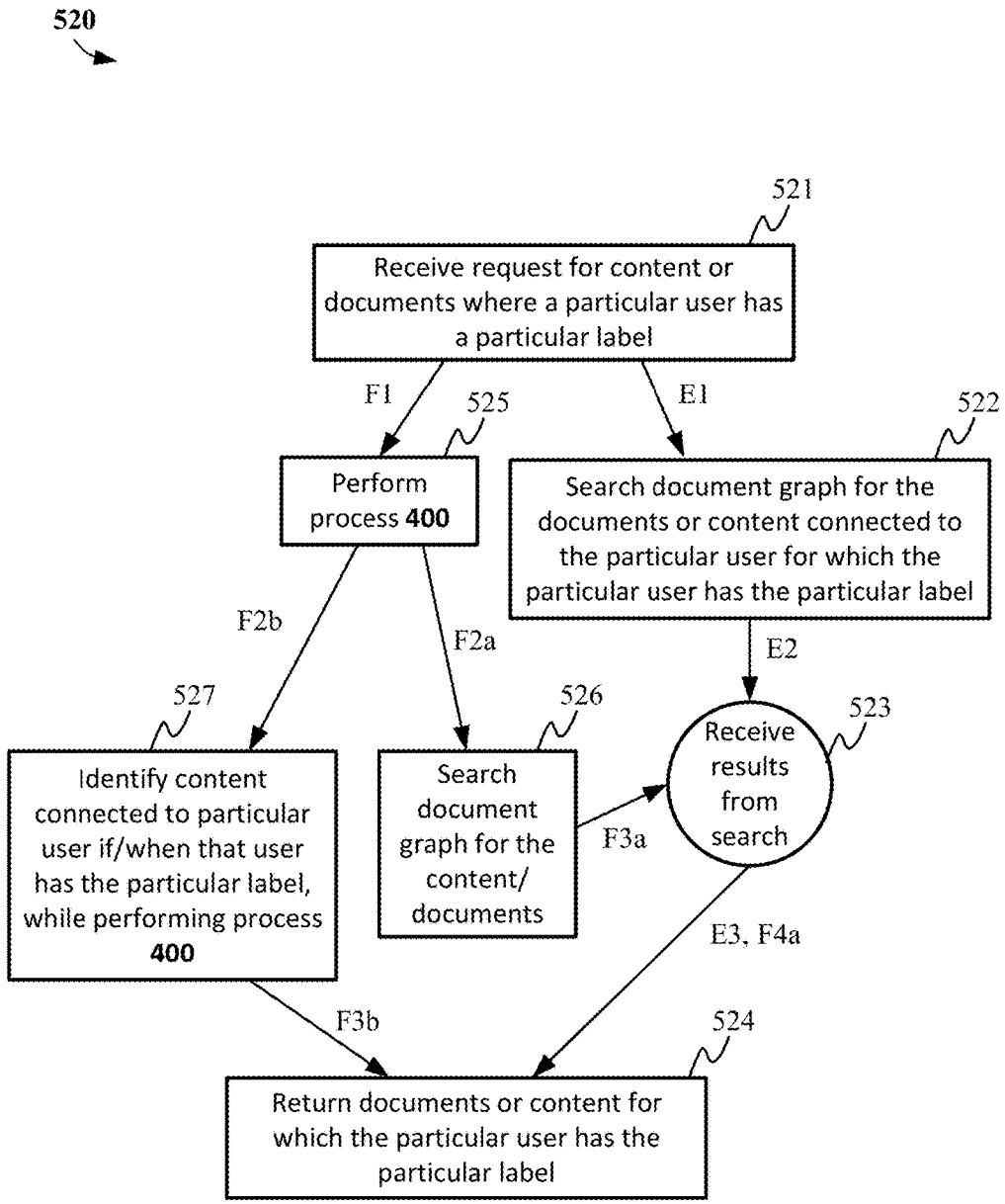

FIGS. 5A-5C illustrate example processes in which the described enhanced document graphs (and associated classifying processes) may be used to improve content reuse.

Referring to FIG. 5A, a process 500 for identifying users having a particular label can begin when a request is received for identifying users having a particular label (501). In some cases, process 400 is performed before the request is received. In one such case as illustrated in path A1-A2-A3, the service receiving the request can search the document graph for the particular label (502). For example, a service performing process 500 may search a document graph (such as document graph 730 of FIG. 7). The results from the search of the document graph can be received (503) and a list of users having the particular label can be returned in response to the request (504). Receipt of the results may occur in stages or may be directed by additional parameters included with the original request for users having a particular label or in a query associated with the search. In some cases, after the request is received (501), process 400 is performed (505). In this case, process 400 may be performed even if process 400 had been performed prior to receiving the request (501).

In one implementation as illustrated in path B1-B2a-B3a-B4a, the service receiving the request can perform process 400 (505). Process 400 may be performed on all of the document graph or a subset of the document graph, and may be based on additional parameters of the request. Where the results of process 400 are written back to the document graph, the service queries the document graph for the particular label (506) and waits to receive the results from the search (503) before returning the list of users having the particular label in response to the request (504).

In another implementation as illustrated in path B1-B2b-B3b, the service receiving the request performs process 400 and identifies users having the particular label while performing process 400 (507) so that it is not necessary to search the document graph (or be concerned whether the actor class labels are written back to the graph). A list of the identified users having the particular label can then be returned in response to the request (504).

Process 500 can be carried out with additional parameters, for example, to identify the users that have the particular label for particular content and/or that are also connected in some manner to another particular user (e.g., by being in a same group or course as the another particular user or by being in a contacts list of that another particular user). In an example scenario, a document graph can be searched for a set of users having a connection to a particular user (who may be identified by a user ID); and it is from this set of users that the users having the particular label are identified. Similarly, a set of users may be established from those connected to a particular piece of content (e.g., having a content identifier); and it is from this set of users that the users having the particular label may be identified.

Referring to FIG. 5B, a process 510 for identifying labels of user(s) for a particular document or content can begin when a request is received for identifying labels for users of a particular document or content (511). This request may be sent by an application that includes such information in its graphical user interface (either as part of identifying contributors of a document or by indicating a source for a piece of content that was generated in a collaborative setting) or that enables this functionality for a user to request.

As with the process 500, in process 510, process 400 may have already been performed before the request is received. In one such case as illustrated in path C1-C2-C3, the service receiving the request can search the document graph for the labels of each user connected to the particular document or content (512). The results from the search of the document graph can be received (513) and the label for each user connected to the particular document or content can be returned in response to the request (514). Receipt of the results may occur in stages or may be directed by additional parameters included with the original request.

In some cases, after the request is received (511), process 400 is performed for each user connected to the particular document or content (515). In this case, process 400 may be performed even if process 400 had been performed prior to receiving the request (511).

Once the service receiving the request performs process 400 for each user connected to the particular document or content (515), in the case as illustrated in path D1-D2a-D3a-

D4a, where the results of process 400 are written back to the document graph, the service queries the document graph for the labels of each user connected to the particular document or content (516), waits to receive the results from the search (513), and returns the labels for each user connected to the particular document or content in response to the request (514). However, in some cases, such as illustrated in path D1-D2b, the output of process 400, as performed in operation 515, can directly be returned in response to the request (514).

Referring to FIG. 5C, a process 520 for identifying content (or documents) based on a user's label can begin when a request is received (521). This type of search may be carried out where a user is identified as possibly being associated with content that may be relevant for reuse and that user may both author and review a considerable amount of content. By focusing on the content that the particular user is labeled as a major contributor as opposed to a reviewer, the content most likely relevant for reuse can be determined.

In implementation of process 520, as illustrated in path E1-E2-E3, after receiving the request, the service can search the document graph for the documents or content connected to the particular user for which the particular user has the particular label (522). As in the other described methods, process 400 may have been performed before the request is received. The results from the search of the document graph can be received (523) and a list of documents or content (or the content/documents themselves in some form) may be returned in response to the request (524). Receipt of the results may occur in stages or may be directed by additional parameters included with the original request.

In another path for process 520, as illustrated as path F1-F2a-F3a-F4a, after the request is received (521), process 400 is performed (525) even if process 400 had been performed prior to receiving the request (521). Here, process 400 may be performed on all of the document graph or a subset of the document graph, and may be based on additional parameters of the request. Where the results of process 400 are written back to the document graph, the service queries the document graph for the content or documents that meet the criteria for a particular user with a particular label (526) and waits to receive the results from the search (523) before returning the results in response to the request (524).

In another case, as illustrated in path F1-F2b-F3b, the service receiving the request performs process 400 and identifies content connected to a particular user if/when that user has the particular label while performing process 400 (527) so that it is not necessary to search the document graph in order to return the identified content (or list of content) in response to the request (524).

Process 520 can be carried out with additional parameters, for example, to identify documents having content relevant to a particular topic that are connected to a particular user when that particular user has a particular label. In this case, the results returned in response to the request only contain the content/documents that are relevant to the topic as well as to the user with the particular label with respect to those content/documents.

Figure 6A:
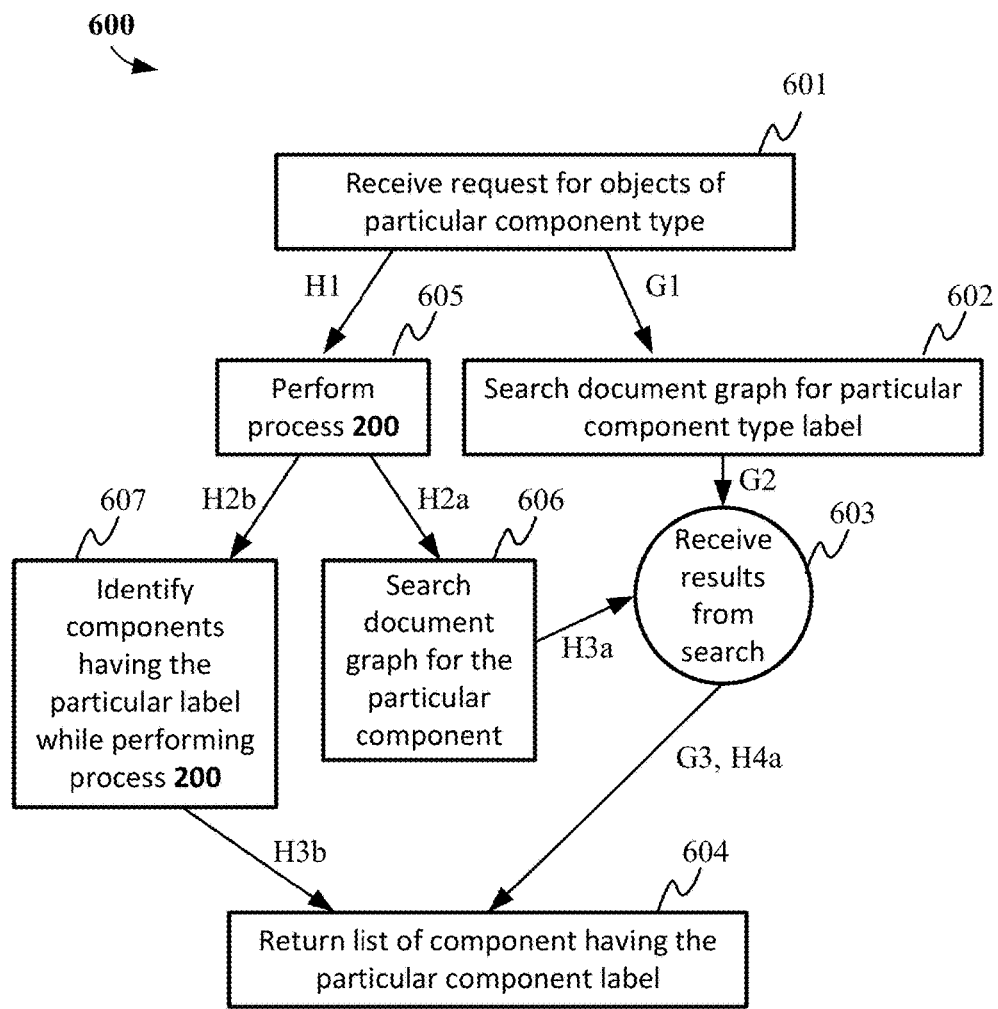
FIGS. 6A and 6B illustrate example processes in which the described enhanced document graphs (and document shredding processes) may be used to improve content reuse.
Figure 6B:
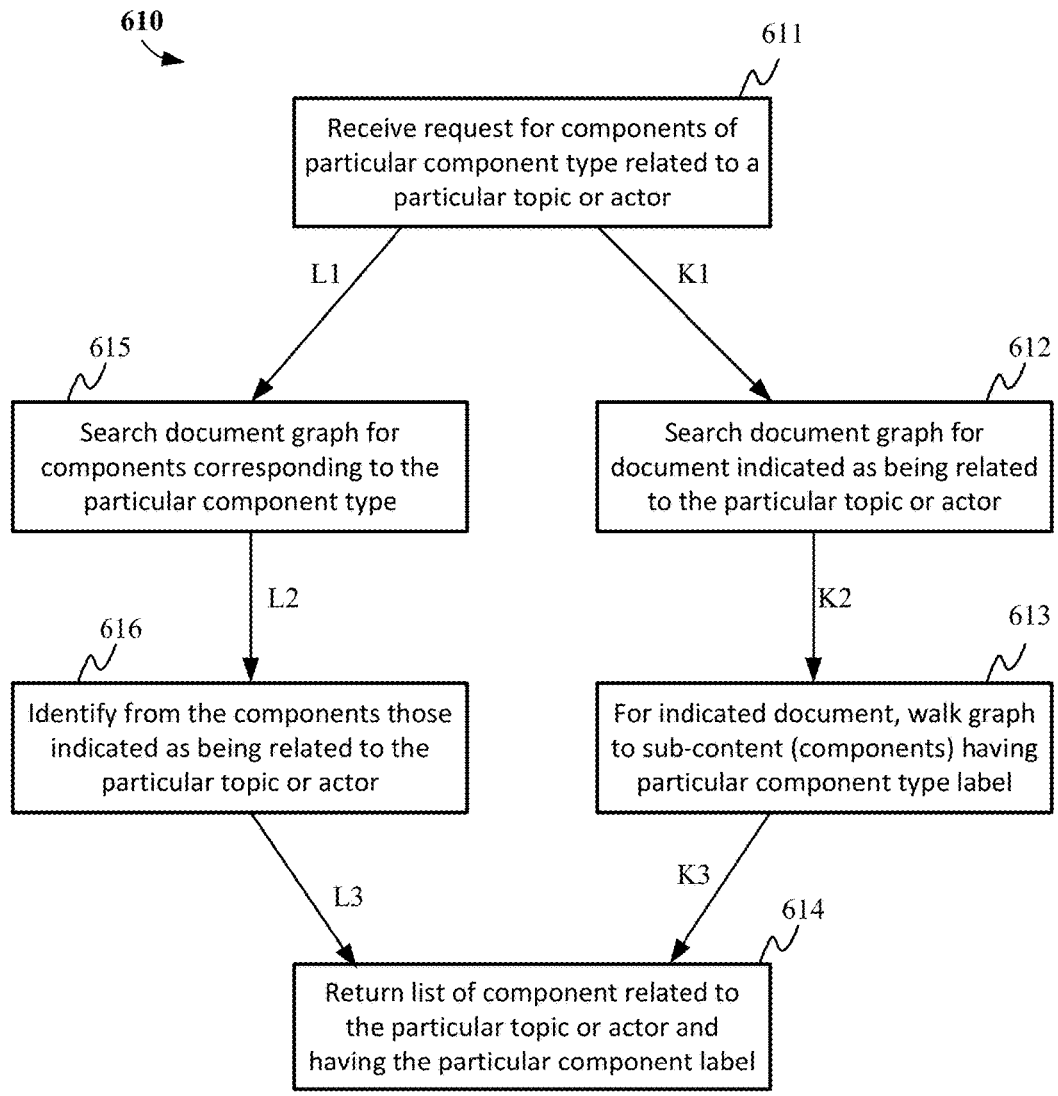

FIGS. 6A and 6B illustrate example processes in which the described enhanced document graphs (and document shredding processes) may be used to improve content reuse.

Referring to FIG. 6A, a process 600 for identifying content components having a particular label can begin when a request is received for identifying content components of a particular component type (601). In some cases, process 200 is performed before the request is received. In one such case as illustrated in path G1-G2-G3, the service receiving the request can search the document graph for the particular component label (602). The results from the search of the document graph can be received (603) and a list of components having the particular component label can be returned in response to the request (604). For example, a request for graphs can return a list of content that is in the form of a graph. Receipt of the results may occur in stages or may be directed by additional parameters included with the original request for users having a particular label or in a query associated with the search. In some cases, after the request is received (601), process 200 is performed (605).

In one implementation as illustrated in path H1-H2a-H3a-H4a, the service receiving the request can perform process 200 (605). Process 200 may be performed on all documents identified in the document graph or a subset of the document graph, and may be based on additional parameters of the request (e.g., a particular document name, a particular user name, etc.). The results of process 200 can be written back to the document graph, and the service can then search the document graph for the particular label (606). After receiving the results from the search (603), the list of components having the particular component label can be returned in response to the request (604).

In another implementation as illustrated in path H1-H2b-H3b, the service receiving the request performs process 200 to shred document(s) into identifiable content components and those content components having the particular label (of component type) can be identified (607). The identification of content components having the particular label can be performed simultaneously with or before writing the labels onto the document graph. A list of the identified users having the particular label can then be returned in response to the request (604).

Process 600 can be carried out with additional parameters, for example, to identify the content components that have the particular label for particular content and/or subject matter and/or that are also connected in some manner to a particular user (who may be identified by a user ID).

Referring to FIG. 6B, process(es) 610 for identifying content components having a particular label (component type) and which are related to a particular topic (subject matter, title, term, theme, etc.) or actor (particular user or user label) can begin when a request is received for identifying content components of a particular component type that are related to a topic or actor (611). It should be understood that a variety of processes may be carried out to identify the "topic" and/or provide appropriate terms for use in searching the document graph.

As with the search of the document graph described in operations 602 and 606 of FIG. 6A, the document graph can be searched to identify the desired content components. Two example implementations are shown, which follow a query-hit-walk approach for searching a graph. It should be understood that other types of searches of a document graph can be implemented in different embodiments and the searching of the graph performed by the service described herein is not limited to the query-hit-walk approach described in detail herein.

In the implementation following path K1-K2-K3, the document graph can first be searched for a document (or documents) indicated as being related to the particular topic or actor (612). Then, from a document indicated as being related (the "hit"), the graph is walked to the sub-content (components) having the particular component type label requested (613). The results of this search can be returned in response to the request (614). In some cases, a copy of the content components themselves are provided along with the list.

In the implementation following path L1-L2-L3, the document graph can be searched for content components having the appropriate component type label (615) and then this subset of content components analyzed to identify whether the content component is related to the particular topic or actor (616). In many cases, the topic of (or even the actor associated with an action taken on) a content component may be stored as an attribute of the node or the edge for that content component. The results of the search can be returned in response to the request (614).

As an illustrative example, a request may be for component type of plots that show topic of QY13 sales. The graph search can begin by searching for documents having content identified with topic QY13 sales and then when a document is identified (the "hit"), the graph can be traversed (or "walked") to identify the component(s) or sub-component(s) with the appropriate component type label (e.g., of "plot"). In some cases, the results can also return other plots that not connected to the identified document but are connected to the user connected to the document identified with topic QY13 sales. This may in some cases occur when the user is labeled with QY13 to indicate a topic the user contributed to (and such information could be contained in the graph as part of or associated with the user node).

Although the described techniques are specifically described with respect to taking advantage of graph structures, the data may alternatively be stored in other structures. In such alternative embodiments, any suitable mechanism for searching may be used where the data about user relationships, documents associated with those users (by the users creating, modifying, or suitably interacting with those documents), and the dates/times the users created, modified, or suitably interacted with those documents may be available.

Figure 7:
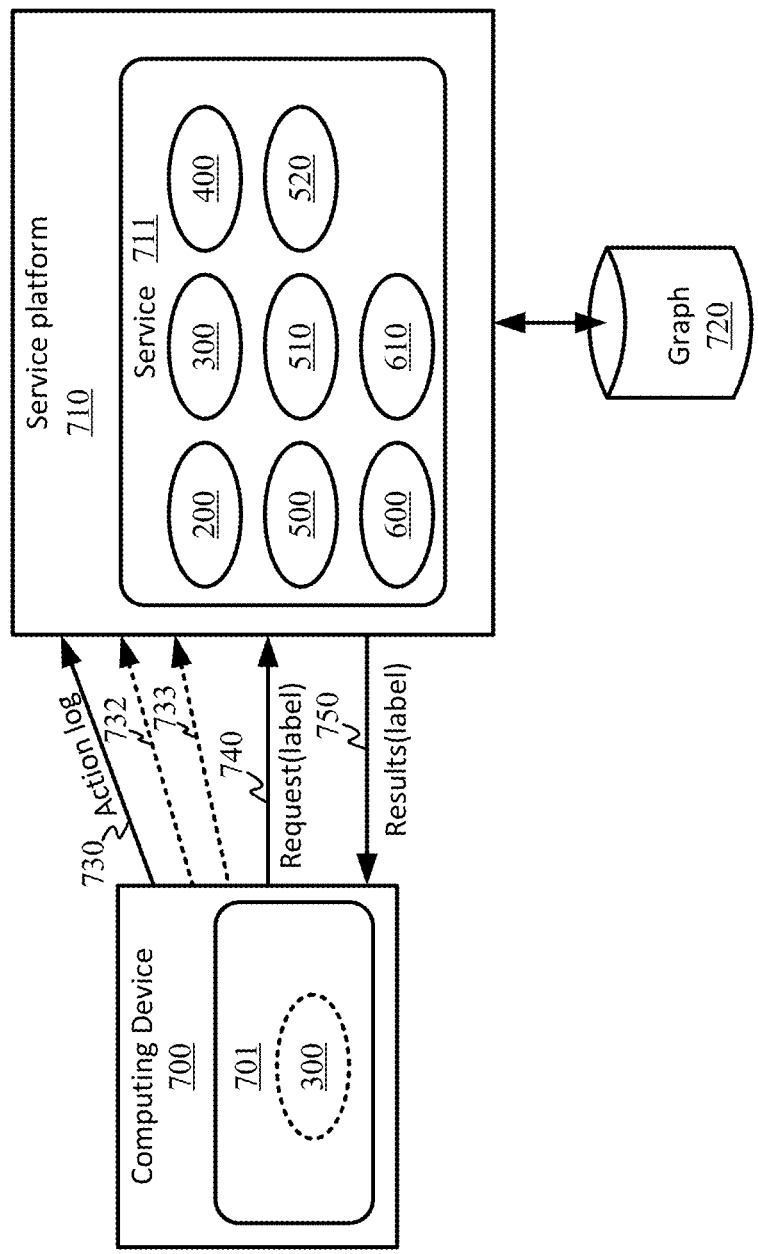
FIG. 7 illustrates an operating environment in which the described techniques may be carried out.

FIG. 7 illustrates an operating environment in which the described techniques may be carried out. As shown in FIG. 7, users may create, modify, share, and collaborate on documents using a variety of productivity applications running at least in part as client application(s) 701 on computing device 700.

Figure 9:
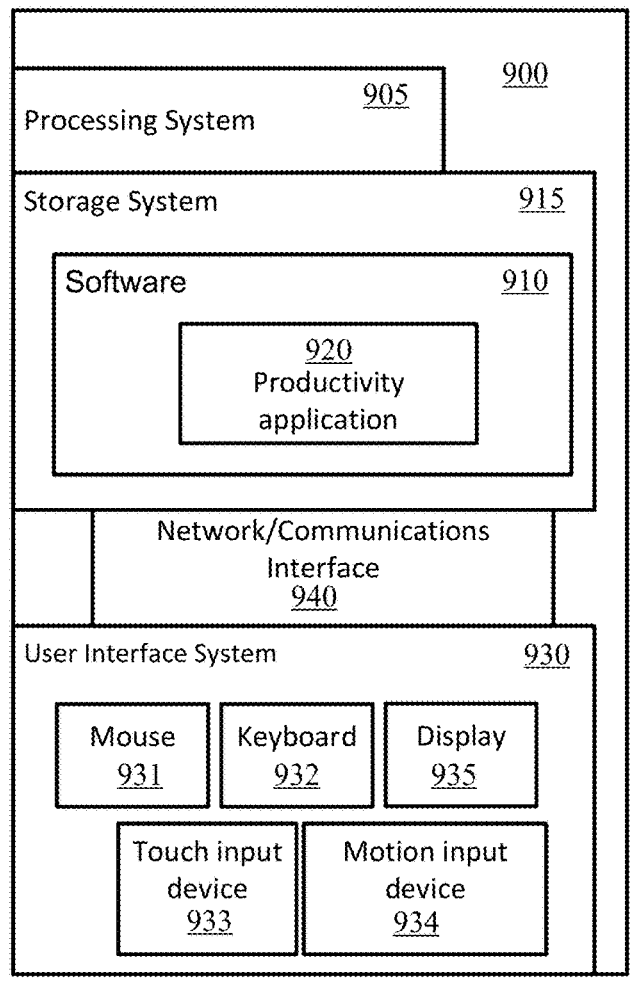
FIG. 9 illustrates components of a computing device that may be used in certain implementations described herein.

Examples of computing device 700 include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 900 illustrated in FIG. 9 is representative.

In some cases, client application(s) 701 can implement a web application version of a productivity application through a web browser (e.g., a browser-based application that executes in the context of a browser application). In some cases, client application(s) 701 implement a locally installed and executed productivity application, a streamed productivity application, a mobile productivity application, or any combination or variation thereof.

A productivity application can include word processing applications, spreadsheet applications, presentation applications, web browsers, email applications, blogging and micro-blogging applications, social networking applications, and gaming applications. Examples of productivity applications include the Microsoft Office® suite of applications from Microsoft Corp., including Microsoft Word®, Microsoft Excel®, Microsoft PowerPoint®, as well as the web application components thereof, all registered trademarks of Microsoft Corp.; Google Docs (and Google Drive™); the Apache OpenOffice™ available from the Apache Software Foundation; the LibreOffice® suite of applications available from The Document Foundation, registered trademarks of The Document Foundation; and the Apple iWork® suite of applications from Apple Inc., including Apple Pages®, Apple Keynote®, and Apple Numbers®, all registered trademarks of Apple Inc.

In some cases, data is collected while a user is interacting with and authoring (or editing content) within a productivity application 701. The collected data can include the commands (available from the particular productivity application) and other interactions a user may have with portions of content while consuming or authoring the content. This data may be collected locally, for example, as part of a session (or instance) of the productivity application (and stored at the computing device 700). In addition or as an alternative to local collection of data, a service 711 (running on a service platform 710) that is associated with or that may communicate with the productivity application can, with user permission collect data from a local session (and store this data at or in connection to the service platform 710).

Figure 10:
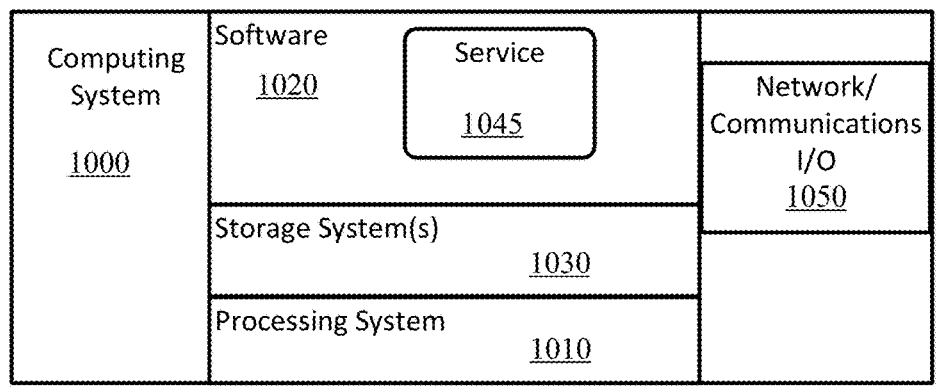
FIG. 10 illustrates components of a computing system that may be used to implement certain methods and services described herein.

Service platform 710 is representative of any physical or virtual computing system, device, or collection thereof capable of hosting all or a portion of service 711. Examples of service platform 710 include, but are not limited to, web servers, application servers, rack servers, blade servers, virtual machine servers, or tower servers, as well as any other type of computing system, of which computing system 1000 of FIG. 10 is representative. In some scenarios, service platform 710 may be implemented in a data center, a virtual data center, or some other suitable facility. In some cases, service platform 710 may be implemented similarly to computing system 1000. A document graph 720 may be stored in a resource that is part of or accessible by the service platform 710. The document graph 720 may be generated and maintained by the service 711.

In some cases, application 701 may be considered remote from service 711 in that each are implemented on separate computing platforms. In such situations, application 701 and service 711 may communicate by way of data and information exchanged between computing device 700 and service platform 710 over a suitable communication link or links (not shown). In other cases, the features and functionality provided by application 701 and service 711 can be co-located or even integrated as a single application.

The initial data collected from a user's interaction with a document and/or content within a productivity application 701 may be stored in any suitable data structure at the computing device 700 or service platform 710. In some cases, the data is initially collected in a session log that may include a session identifier, a user identifier, an action identifier, and when available, a content identifier indicating a content component/sub-component or location of the content component/sub-component for which a particular action identified by the action identifier was carried out. In some cases, at least some of the collected data is directly stored in a document graph (which may be a same or different graph than that referred to with reference number 720).

A client or server application (or software module) associated with (and/or in communication with) the productivity application 701 can access this collected data and perform a variety of processes on the data, such as an action classification process 300 and/or a user classification process 400. In addition to action and actor/user classification processes that can be carried out, the client or server application (or software module) can perform document shredding. For example, service 711 can represent the service that carries out one, two, or all of processes 200, 300, 400 and 410 as well has handles certain queries of a document graph on behalf of the productivity application 701 (see e.g., processes 500, 510, 520, 600, and 610 described with respect to FIGS. 5A-5C and 6A-6B).

In a case where the processes for a labeler (the software instructions directing the system to perform processes 300, 400 and 410) are all performed at the service platform 710, the session log collected at the computing device 700 can be communicated, as an action log 730, to the service 711 for processing and appropriately writing to the document graph 720. The communication of this information can be performed at designated times (e.g., upon a save action within the productivity application 701, at the end of a user's session, once a day, every hour, etc.) or upon request of the service 711 performing the process 300.

In a case where at least part of the action classification process 300 is performed at the client (as part of the productivity application 701 or as an add-on or separate application that can communicate with the productivity application 701), the resulting normalized action 732 (e.g., after step 302) can be communicated to the service 711 for writing to the document graph. In another such implementation, but where a local document graph (or partial graph) is maintained, or a synchronization message 733 (e.g., providing changes or updates) can be communicated to the service 711 for updating the document graph stored at the server platform 710 based on updates to the local document graph stored at the computing device 700.

The user classification process 400 (and/or content classification process 410) can be carried out at certain instances of time and stored in a manner that can be later retrieved, for example, by being written to the document graph 720. The user classification process 400 may be carried out or the stored results retrieved in response to a request to classify one or more users, for example as part of a request 740 from application 701 to the service 711. The roles or labels identified by mapping the normalized actions taken by a user to an actor class can be returned in response to the request (as response 750) and/or written back into the document graph 720. Similarly, the content classification process 410 may be carried out or the stored results retrieved in response to a request to classify one or more pieces of content, for example as part of a request 740 from application 701 to the service 711. The roles or labels identified by mapping the normalized actions taken by users on a piece of content can be returned in response to the request (as response 750) and/or written back into the document graph 720.

Figure 8A:
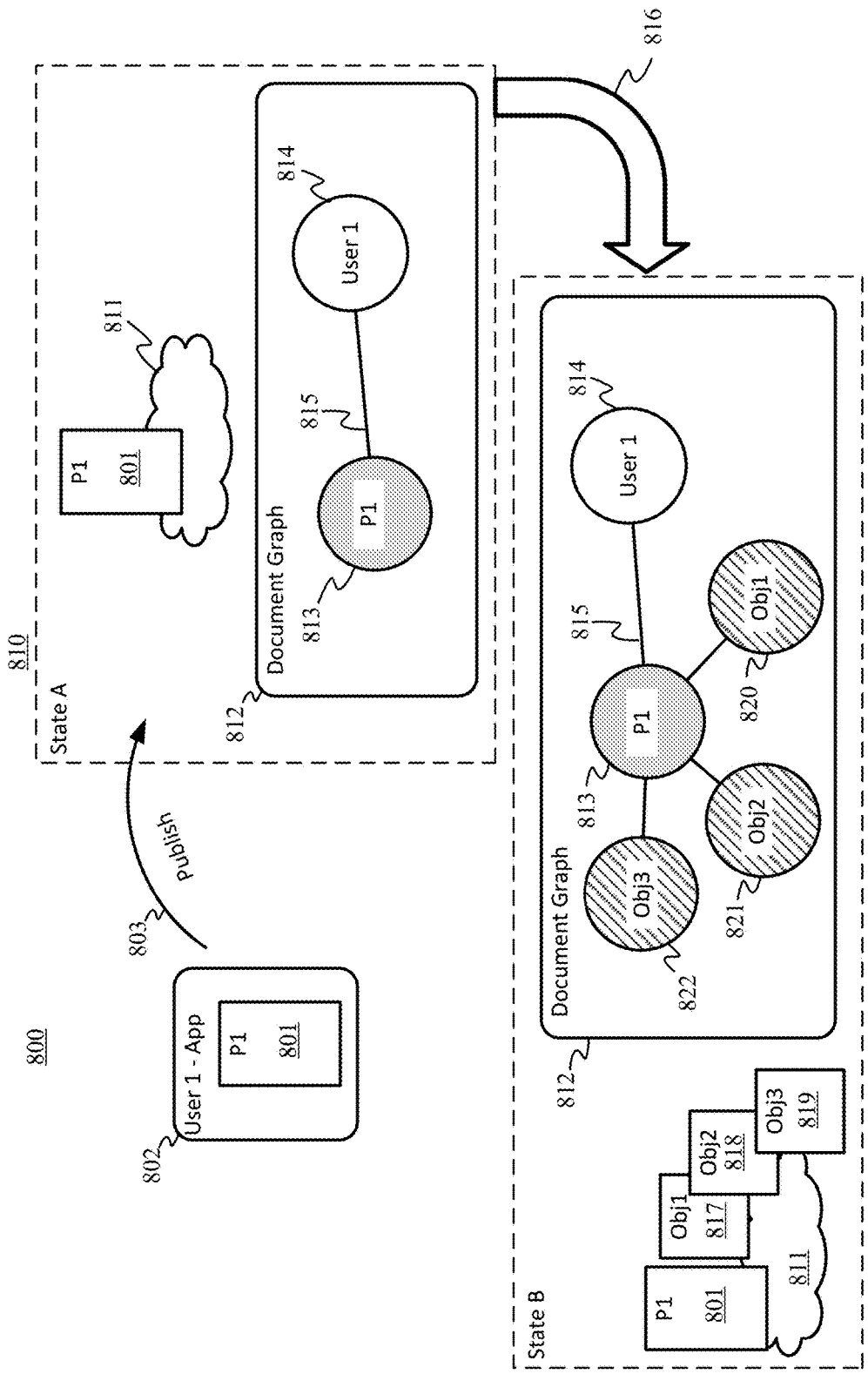
FIGS. 8A-8C illustrate an example scenario of reuse of content within documents.
Figure 8B:
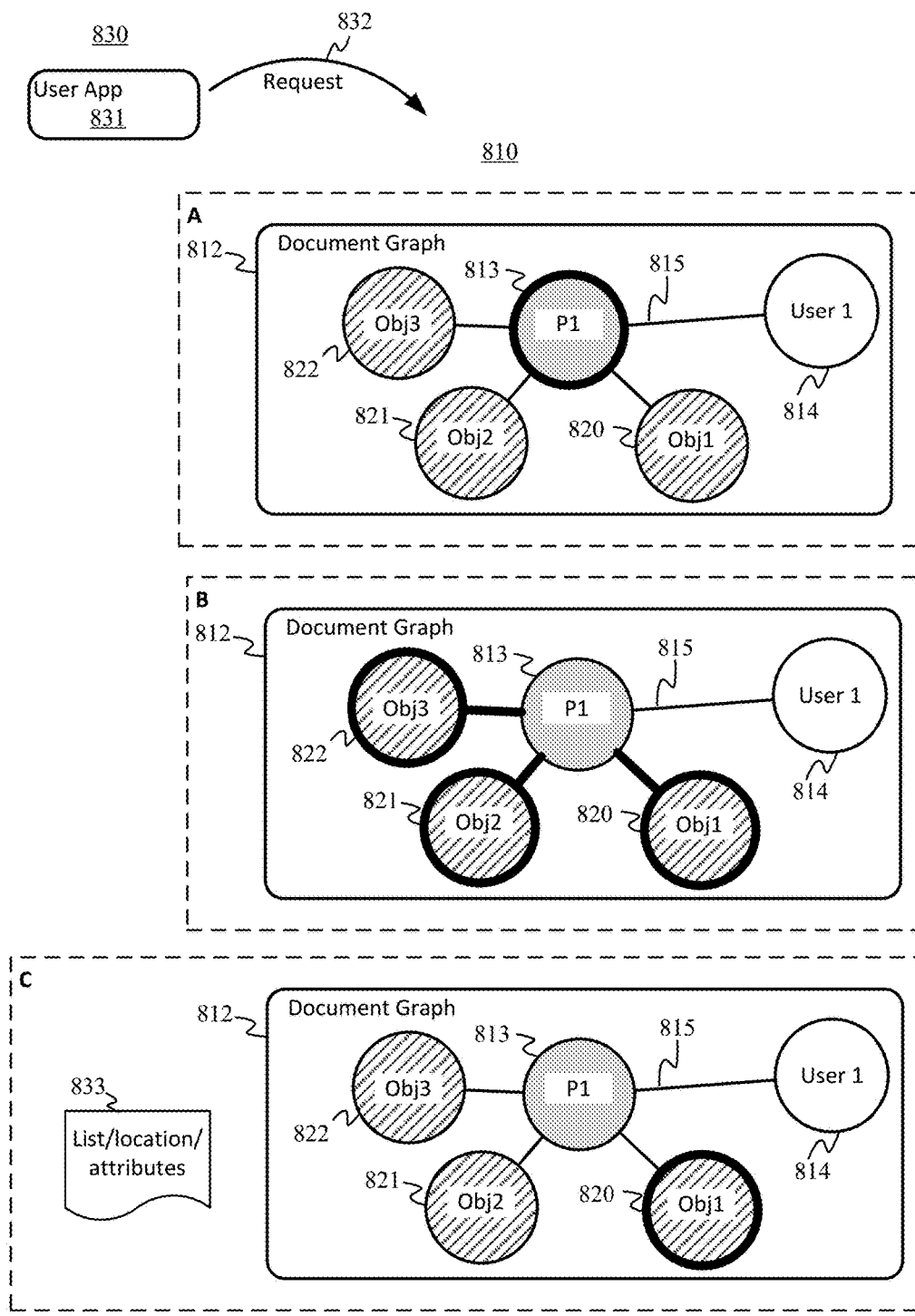
Figure 8C:
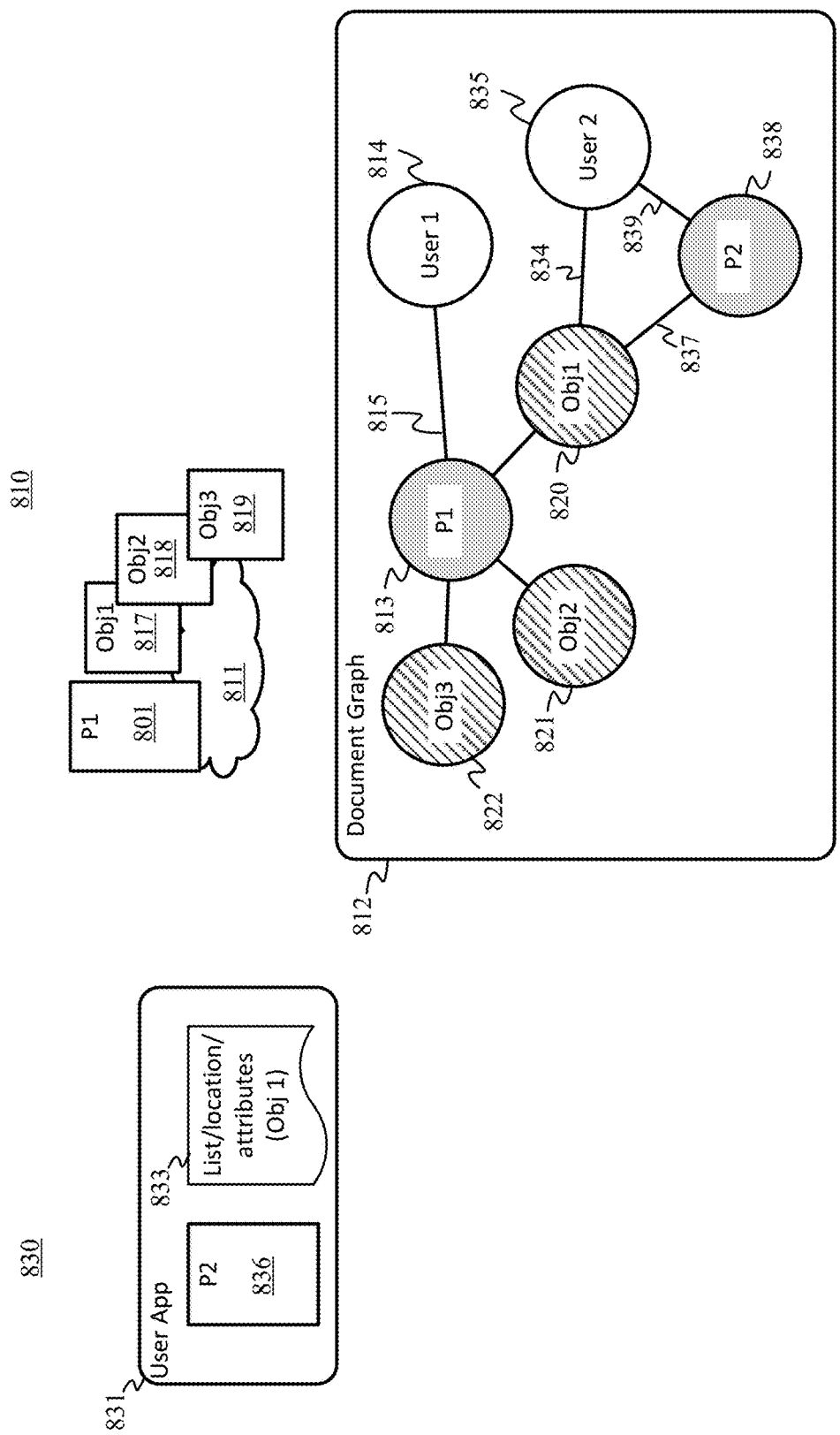

FIGS. 8A-8C illustrate an example scenario of reuse of content within documents. Referring to FIG. 8A, at a client system 800 (which may be implemented on a computing system 900, a first user may be working on a document P1 801 in a productivity application 802. The user may be logged in to the client system 800 such that the productivity application 802 associates the user's activities with the user. The user may then publish 803 the document P1 801. This step of publishing may be a specific command (e.g., to publish, to share, or to save to a particular location for sharing) or may be a function of the productivity application (with permission but without explicit command of the user). At the server system 810, a copy of the document P1 801 can be stored in a storage system 811 associated with, or accessible by, the server system 810 and a document graph 812 can be updated with a document node 813 representing the document P1 801 connected to a user node 814 representing the user by action edge 815.

Process 300 may have been carried out and the action classes labeled/written into the document graph. In response to receiving an indication that the document P1 has published, as a result of a programmatic initiation, or as part of a crawl of published documents, the reusable content components can be extracted from the document P1 801, for example, processes such as described with respect to process 200. In the illustrated example, extraction operation 816 can extract reusable content components Obj1 817, Obj2 818, and Obj3 819 and separately store these content components from document P1 801. The reusable content components Obj1 817, Obj2 818, and Obj3 819 can be stored on a same or different storage system as the first document P1 801.

In some cases, even though the content components are separately stored, they can be synced to their counterparts in the source document or at least connected in a manner that if not included in another document, the content component can be deleted when the source document (e.g., document P1 801) is deleted. The sub-components of the reusable content components Obj1 817, Obj2 818, and Obj3 819 can be represented in the document graph 812 as component nodes 820, 821, and 822, respectively. Attributes corresponding to the content components' relationships with the document P1 can be associated with the edges between each of the component nodes 820, 821, and 822 and the document node 813.

Although not shown in the drawing, in some implementations, each component node can also be connected to the user node 814 via an action edge.

A second user (or even the same user) can, via for example a productivity application, communicate with a service (that performed the extraction/indexing and/or labeling) to request reusable content components associated with a document. The process may be carried out as described with respect to process 610 (e.g., path K1-K2-K3). For example, as illustrated in FIG. 8B, a productivity application 831 at a client system 830 can request (832) from the service (such as available at service system 810) a particular component type from a particular document (either specifically named or identified as most likely relevant to the request).

As illustrated in A, from a query for the search of the document graph, the service can identify ("hit") the node 813 representing document P1 of the document graph since this node 813 would meet the conditions indicating that it corresponds to the particular document named in the request. In some cases, the criteria involves the document name. In some cases, the criteria involves terms in a document description. In some cases, the criteria involves any document connected to a particular user (or a user having a particular label). Once at the document node 813, the graph can be walked as shown in B to identify the component nodes 820, 821, and 822 connected to the document node 813 and determine whether one of the component nodes satisfies the requested component type. As illustrated in C, the component type for content component Obj1 is determined to satisfy the requested component type and the location (e.g., for retrieval) and/or attributes of the content component Obj1 can be provided in a response 833 to the request.

Advantageously, just the extracted content components may be returned to the application 831 for display, without the need for the application to download the entire document.

Since the second user (via application 831) performed an action with respect to the content component Obj1, an action edge 834 can be established between a user node 835 representing the second user and the component node 820, such as illustrated in FIG. 8C. Here, the action may be "view". In the case where the second user, after having received an indication from the productivity application 831 that content component Obj1 817 satisfies the desired criteria, decides to include content component Obj1 817 as part of her own document P2 836, the attribute assigned to an action edge (which may be a same edge or a different edge as action edge 834) can be "insert" (or other defined label). In addition, a 'contains' edge 837 can be generated between the component node 820 and the second document node 838, which is itself connected by action edge 839 to the user node 835 representing that user. In addition, as described with respect to FIG. 1B, a connection (not shown) may, in some cases, be made between the two user nodes 814, 835.

In some cases, the activity history of a document or a component (or sub-component) of a document can also be queried via the indexing service. In some implementations, the activity history can be obtained by reading the normalized action(s) written to a document graph during process 300. In some implementations, the content class identified from process 410 can be obtained during a search of the activity history.

FIG. 9 illustrates components of a computing device that may be used in certain implementations described herein; and FIG. 10 illustrates components of a computing system that may be used to implement certain methods and services described herein.

Referring to FIG. 9, system 900 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 900 may be incorporated to implement a particular computing device.

System 900 includes a processing system 905 of one or more processors to transform or manipulate data according to the instructions of software 910 stored on a storage system 915. Examples of processors of the processing system 905 include general purpose central processing units, application specific processors, and logic devices, as well as any other type of processing device, combinations, or variations thereof. The processing system 905 may be, or is included in, a system-on-chip (SoC) along with one or more other components such as network connectivity components, sensors, video display components.

The software 910 can include an operating system (OS) and application programs such as a productivity application 920 that can take advantage of the document storage for reuse of content within documents such as described herein.

Device OS generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical. It should be noted that the OS may be implemented natively on the computing device and/or on software virtualization layers running atop the native device OS. Virtualized OS layers, while not depicted in FIG. 9, can be thought of as additional, nested groupings within the operating system space, each containing an OS, application programs, and application programming interfaces (APIs).

Storage system 915 may comprise any computer readable storage media readable by the processing system 905 and capable of storing software 910 including the productivity application 920. Storage system 915 may include volatile and nonvolatile, removable and non-removable media implemented in any method or technology for storage of information, such as computer readable instructions, data structures, program modules, or other data. Examples of storage media of storage system 915 include random access memory, read only memory, magnetic disks, optical disks, CDs, DVDs, flash memory, magnetic cassettes, magnetic tape, magnetic disk storage or other magnetic storage devices, or any other suitable storage media. In no case does storage media consist of a propagated signal or carrier wave.

Storage system 915 may be implemented as a single storage device but may also be implemented across multiple storage devices or sub-systems co-located or distributed relative to each other. Storage system 915 may include additional elements, such as a controller, capable of communicating with processing system 905.

The system can further include user interface system 930, which may include input/output (I/O) devices and components that enable communication between a user and the system 900. User interface system 930 can include input devices such as a mouse 931, track pad (not shown), keyboard 932, a touch device 933 for receiving a touch gesture from a user, a motion input device 934 for detecting non-touch gestures and other motions by a user, a microphone for detecting speech (not shown), and other types of input devices and their associated processing elements capable of receiving user input.

The user interface system 930 may also include output devices such as display screen(s) 935, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with graphics or other information presented on the display.

Visual output may be depicted on the display 935 in myriad ways, presenting graphical user interface elements, text, images, video, notifications, virtual buttons, virtual keyboards, or any other type of information capable of being depicted in visual form.

The user interface system 930 may also include user interface software and associated software (e.g., for graphics chips and input devices) executed by the OS in support of the various user input and output devices. The associated software assists the OS in communicating user interface hardware events to application programs using defined mechanisms. The user interface system 930 including user interface software may support a graphical user interface, a natural user interface, or any other type of user interface. For example, the interfaces for the productivity application and/or the productivity tool for assisted collaborative content authoring (and corresponding functionality) described herein may be presented through user interface system 930.

Communications interface 940 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein, such as those carried out at service platform 710 may be performed on a system such as shown in FIG. 10. Referring to FIG. 10, system 1000 may be implemented within a single computing device or distributed across multiple computing devices or sub-systems that cooperate in executing program instructions. The system 1000 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

FIG. 10 illustrates components of a computing system that may be used to implement certain methods and services described herein The system 1000 can include a processing system 1010, which may include one or more processors and/or other circuitry that retrieves and executes software 1020 from storage system 1030. Processing system 1010 may be implemented within a single processing device but may also be distributed across multiple processing devices or sub-systems that cooperate in executing program instructions.

Storage system(s) 1030 can include any computer readable storage media readable by processing system 1010 and capable of storing software 1020. Storage system 1030 may be implemented as a single storage device but may also be implemented across multiple storage devices or sub-systems co-located or distributed relative to each other. Storage system 1030 may include additional elements, such as a controller, capable of communicating with processing system 1010. Storage system 1030 may also include storage devices and/or sub-systems on which data such as entity-related information is stored. As with the storage media of storage system 915, storage media of storage system 1030 do not consist of propagating signals or carrier waves.

Software 1020 may be implemented in program instructions and among other functions may, when executed by system 1000 in general or processing system 1010 in particular, direct the system 1000 or processing system 1010 to operate as described herein for service 711, including performing one or more of a document shredding process such as described with respect to FIG. 2, an action classification process such as described with respect to FIG. 3, a user classification process such as described with respect to FIG. 4A, a content classification process such as described with respect to FIG. 4B, or search processes such as described with respect to FIGS. 5A-5C and 6A-6B.

System 1000 may represent any computing system on which software 1020 may be staged and from where software 1020 may be distributed, transported, downloaded, or otherwise provided to yet another computing system for deployment and execution, or yet additional distribution.

In embodiments where the system 1000 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 1050 may be included, providing communication connections and devices that allow for communication between system 1000 and other computing systems (not shown) over a communication network or collection of networks (not shown) or the air.

Certain techniques set forth herein may be described in the general context of computer-executable instructions, such as program modules or processing steps, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

Certain aspects of the invention provide the following non-limiting embodiments:

Example 1

A method, executed at least in part by a computing device, comprising: aggregating, for a window of time, a plurality of actions carried out by a user on content associated with a document within a productivity application; normalizing the plurality of actions into at least one predefined action class; and determining a label of the user in relation to the document or a portion of the content associated with the document.

Example 2

The method of example 1, wherein determining the label of the user in relation to the document or the portion of the content associated with the document comprises: mapping one or more of the at least one predefined action class to an actor class; and classifying the user as belonging to the actor class according to the actions the user has taken on the document or the portion of the content associated with the document, the actor class indicating the label.

Example 3

The method of example 1 or 2, wherein the label comprises one of reviewer, minor contributor, major contributor, presenter, influencer, propagator, and commenter.

Example 4

The method of any of examples 1-3, wherein the aggregating and the normalizing are performed for a plurality of users performing actions on the document or the portion of the content associated with the document or the portion of the content, the method further comprising: determining a content class for the document according to the actions the plurality of users have performed on the document or the portion of the content.

Example 5

The method of any of examples 1-3, further comprising: storing the label associated with the user and the document or the portion of the content in a document graph.

Example 6

The method of example 5, further comprising storing a timestamp with the label in the document graph.

Example 7

The method of any of examples 1-6, further comprising: receiving a request for identifying users having a particular label; and identifying the users having the particular label after determining the label of the user in relation to the document or the portion of the content associated with the document.

Example 8

The method of example 7, wherein the request comprises an indication of the particular label and a user identifier, wherein identifying the users having the particular label comprises: searching a document graph for a set of users connected to a specific user identified by the user identifier; and identifying, from within the set of users, the users having the particular label.

Example 9

The method of example 7 or 8, wherein the request comprises an indication of the particular label and a content identifier, wherein identifying the users having the particular label comprises: searching a document graph for a set of users connected to a specific content identified by the content identifier; and identifying, from within the set of users, the users having the particular label.

Example 10

The method of any of examples 1-9, further comprising: receiving a request for identifying labels of users associated with a particular content or document; and identifying the labels of the users associated with the particular content or document by the determining of the label of the user for each of the users associated with the particular content or document.

Example 11

The method of any of examples 1-10, wherein the user comprises a particular user, the method further comprising: receiving a request for identifying content related to the particular user for which the particular user has a particular label; and identifying the content related to the particular user for which the particular user has the particular label after determining the label of the user in relation to the document or the portion of the content associated with the document.

Example 12

The method of example 11, wherein the request comprises an indication of the particular label, the particular user, and at least one topic, wherein identifying the content related to the particular user for which the particular user has the particular label comprises: searching a document graph for a set of content connected to the particular user and for which the particular user has the particular label; and identifying, from within the set of content, the relevant content related to the at least one topic.

Example 13

A system for reuse of content within documents, the system comprising: one or more computer readable storage media; a document graph stored on at least one of the one or more computer readable storage media; and labeler software stored on at least one of the one or more computer readable storage media that when executed by a processing system, directs the processing system to at least: aggregate, for a window of time, a plurality of actions carried out by a user on content associated with a document within a productivity application; normalize the plurality of actions into at least one predefined action class; determine a label of the user in relation to the document or a portion of the content associated with the document based on the at least one predefined action class; and store the label associated with the user and the document or the portion of the content in a document graph.

Example 14

The system of example 13, wherein the instructions that direct the processing system to determine the label of the user in relation to the document or the portion of the content associated with the document comprises instructions that direct the processing system to: map one or more of the at least one predefined action class to an actor class; and classify the user as belonging to the actor class according to the actions the user has taken on the document or the portion of the content associated with the document, the actor class indicating the label.

Example 15

The system of example 13 or 14, wherein the label comprises one of reviewer, minor contributor, major contributor, presenter, influencer, propagator, and commenter.

Example 16

The system of any of examples 13-15, wherein the instructions to aggregate and normalize are performed for a plurality of users performing actions on the document or the portion of the content associated with the document or the portion of the content, the instructions further comprising instructions that, when executed by a processing system, direct the processing system to: determine a content class for the document according to the actions the plurality of users have performed on the document or the portion of the content.

Example 17

The system of example 16, wherein the content class comprises one of modified content, reused content, consumed content, presented content, and shared content.

Example 18

The system of any of examples 13-17, further comprising storing a timestamp with the label in the document graph.

Example 19

One or more computer readable storage media having instructions stored thereon for facilitating content reuse that, when executed, direct a processing system to: receive a request for identifying users having a particular label; map one or more of at least one predefined action class to an actor class including the actor class comprising the particular label; classify each user of at least a set of users as belonging to the actor class according to the actions the user has taken on the document or the portion of the content associated with the document; and indicate the users having the particular label.

Example 20

The media of example 19, wherein the request comprises an indication of the particular label and a user identifier, the instructions further directing the processing system to: write labels for each of the users on a document graph based on the actor class to which the user belongs search the document graph for the set of users that are connected to a specific user identified by the user identifier; and identify, from within the set of users, the users having the particular label.

Example 21

The media of example 19 or 20, wherein the request comprises an indication of the particular label and a content identifier, the instructions further directing the processing system to: write labels for each of the users on a document graph based on the actor class to which the user belongs; search the document graph for the set of users that are connected to a specific content identified by the content identifier; and identify, from within the set of users, the users having the particular label.

Example 22

The media of any of examples 19-21, further comprising instructions that direct the processing system to: receive a request for identifying labels of users associated with a particular content or document; and provide labels for the set of users that are associated with the particular content or document based on the actor class to which each user of the set of users belongs.

Example 23

The media of any of examples 19-22, further comprising instructions that direct the processing system to: write labels for each of the users on a document graph based on the actor class to which the user belongs; receive a request for identifying content related to a particular user for which the particular user has a particular label, the request comprising an indication of the particular label and a user identifier for the particular user; search the document graph for a set of content that is connected to the particular user identified by the user identifier; and identify, from within the set of content, the content associated with the particular label for the particular user.

Example 24

The media of example 23, wherein the request further comprises an indication of at least one topic, the instructions further directing the processing system to: identify, from within the set of content, relevant content that is related to the at least one topic and associated with the particular label for the particular user; and indicate the relevant content.

Example 25

A system comprising means for performing the method according to any of examples 1-12.

Example 26

One or more computer readable storage media having instructions stored therein for performing the method of any of examples 1-12.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, executed at least in part by a computing device, comprising:
    identifying at least one predefined action class from a session log for a user for an aggregated window of time during which the user interacted with content associated with a document within a productivity application by normalizing a plurality of actions, wherein the normalizing of the plurality of actions comprises classifying the plurality of actions into the at least one predefined action class;
    determining a label of the user in relation to the document or a portion of the content associated with the document based on the at least one predefined action class by:
        mapping the at least one predefined action class to an actor class; and
        assigning the user as belonging to the actor class determined based on the mapping of the at least one predefined action class to the actor class, the actor class including the label;
    storing the label associated with the user and the document or the portion of content in a document graph to indicate a relationship between the user and the document or portion of the content associated with the document;
    receiving a request for reusable content, wherein the request for reusable content comprises a particular label, wherein the particular label is a label for a user who has created content that has been reused by other users, a label for a user who reuses or shares content created by other users, or a label for a user who has interacted with new or previously created content;
    in response to the request for reusable content, searching the document graph for content connected to the user or another user for which the user or the another user has the particular label; and
    providing the content for reuse to a source of the request.

2. The method of claim 1, wherein the label comprises one of reviewer, minor contributor, major contributor, presenter, influencer, propagator, and commenter.

3. The method of claim 1, wherein the identifying is performed for a plurality of users performing actions on the document or the portion of the content associated with the document or the portion of the content, the method further comprising:
    determining a content class for the document according to the actions the plurality of users have performed on the document or the portion of the content.

4. The method of claim 1, further comprising storing a timestamp with the label in the document graph.

5. The method of claim 1, wherein searching the document graph comprises identifying the users having the particular label after determining the label of the user in relation to the document or the portion of the content associated with the document.

6. The method of claim 5, wherein the request for reusable content further comprises a user identifier, wherein identifying the users having the particular label comprises:
    searching the document graph for a set of users connected to a specific user identified by the user identifier; and
    identifying, from within the set of users, the users having the particular label.

7. The method of claim 5, wherein the request for reusable content further comprises a content identifier, wherein identifying the users having the particular label comprises:
    searching the document graph for a set of users connected to a specific content identified by the content identifier; and
    identifying, from within the set of users, the users having the particular label.

8. The method of claim 1, further comprising: receiving a request for identifying labels of users associated with a particular content or document, and
    in response to the request for identifying the labels of the users associated with the particular content or document, searching the document graph for the particular content or document; and
    identifying the labels of the users associated with the particular content or document.

9. The method of claim 1, wherein the user comprises a particular user, wherein the request for reusable content comprises a request for identifying content related to the particular user for which the particular user has the particular label, and wherein the searching the document graph comprises identifying the content related to the particular user for which the particular user has the particular label after determining the label of the user in relation to the document or the portion of the content associated with the document.

10. The method of claim 9, wherein the request for reusable content comprises the particular label, the particular user, and at least one topic, wherein identifying the content related to the particular user for which the particular user has the particular label comprises:
    searching the document graph for a set of content connected to the particular user and for which the particular user has the particular label; and
    identifying, from within the set of content, relevant content related to the at least one topic.

11. A system for reuse of content within documents, the system comprising:
    one or more computer readable storage media;
    a document graph stored on at least one of the one or more computer readable storage media; and program instructions stored on at least one of the one or more computer readable storage media that when executed by a processing system, directs the processing system to at least:
- identify at least one predefined action class from a session log for a user for an aggregated window of time during which the user interacted with content associated with a document within a productivity application by normalizing a plurality of actions, wherein the normalizing of the plurality of actions comprises classifying the plurality of actions into the at least one predefined action class;
- determine a label of the user in relation to the document or a portion of the content associated with the document based on the at least one predefined action class by:
  - mapping the at least one predefined action class to an actor class; and
  - assigning the user as belonging to the actor class determined based on the mapping of the at least one predefined action class to the actor class, the actor class including the label;
- store the label associated with the user and the document or the portion of the content in a document graph to indicate a relationship between the user and the document or the portion of the content associated with the document;
- receive a request for reusable content, wherein the request for reusable content comprises a particular label, wherein the particular label is a label for a user who has created content that has been reused by other users, a label for a user who reuses or shares content created by other users, or a label for a user who has interacted with new or previously created content;
- in response to receiving the request for reusable content, search the document graph for content connected to the user or another user for which the user or the another user has the particular label; and
- provide the content for reuse to a source of the request.

12. The system of claim 11, wherein the label comprises one of reviewer, minor contributor, major contributor, presenter, influencer, propagator, and commenter.

13. The system of claim 11, wherein the instructions to identify are performed for a plurality of users performing actions on the document or the portion of the content associated with the document or the portion of the content, the instructions further comprising instructions that, when executed by the processing system, direct the processing system to:
- determine a content class for the document according to the actions the plurality of users have performed on the document or the portion of the content.

14. The system of claim 13, wherein the content class comprises one of modified content, reused content, consumed content, presented content, and shared content.

15. One or more computer-readable storage media having instructions stored thereon for facilitating content reuse that, when executed, direct a processing system to:
- identify at least one predefined action class from a session log for a user for an aggregated window of time during which the user interacted with content associated with a document within a productivity application by normalizing a plurality of actions, wherein the normalizing of the plurality of actions comprises classifying the plurality of actions into the at least one predefined action class;
- determine a label of the user in relation to the document or a portion of the content associated with the document based on the at least one predefined action class by:
  - mapping the at least one predefined action class to an actor class; and
  - assigning the user as belonging to the actor class determined based on the mapping of the at least one predefined action class to the actor class, the actor class including the label;
- store the label associated with the user and the document or the portion of the content in a document graph to indicate a relationship between the user and the document or the portion of the content associated with the document;
- receive a request for reusable content, wherein the request for reusable content comprises a particular label, wherein the particular label is a label for a user who has created content that has been reused by other users, a label for a user who reuses or shares content created by other users, or a label for a user who has interacted with new or previously created content;
- in response to receiving the request for reusable content, search the document graph for content connected to the user or another user for which the user or the another user has the particular label; and
- provide the content for reuse to a source of the request.

16. The one or more computer-readable storage media of claim 15, wherein the label comprises one of reviewer, minor contributor, major contributor, presenter, influencer, propagator, and commenter.

17. The one or more computer-readable storage media of claim 15, wherein the instructions to identify are performed for a plurality of users performing actions on the document or the portion of the content associated with the document or the portion of the content, the instructions further comprising instructions that, when executed by the processing system, direct the processing system to:
- determine a content class for the document according to the actions the plurality of users have performed on the document or the portion of the content.

* * * * *